US012113593B2

(12) United States Patent
Haustein et al.

(10) Patent No.: US 12,113,593 B2
(45) Date of Patent: Oct. 8, 2024

(54) SPATIAL MULTIPLEXING WITH SINGLE TRANSMITTER ON WIDEBAND CHANNELS

(71) Applicant: KONINKLIJKE PHILIPS N.V., Eindhoven (NL)

(72) Inventors: Thomas Haustein, Berlin (DE); Lars Thiele, Berlin (DE); Martin Kurras, Berlin (DE); Baris Göktepe, Berlin (DE); Cornelius Hellge, Berlin (DE); Thomas Fehrenbach, Berlin (DE); Wilhelm Keusgen, Berlin (DE); Hanguang Wu, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/715,245

(22) Filed: Apr. 7, 2022

(65) Prior Publication Data
US 2022/0231738 A1    Jul. 21, 2022

Related U.S. Application Data

(63) Continuation of application No. PCT/EP2020/078245, filed on Oct. 8, 2020.

(30) Foreign Application Priority Data

Oct. 11, 2019 (EP) .................................... 19202795

(51) Int. Cl.
*H04B 7/0456* (2017.01)
*H04B 7/0408* (2017.01)
*H04B 7/185* (2006.01)

(52) U.S. Cl.
CPC ......... *H04B 7/0456* (2013.01); *H04B 7/0408* (2013.01); *H04B 7/1855* (2013.01)

(58) Field of Classification Search
CPC ... H04B 7/00; H04B 7/01; H04B 7/02; H04B 7/006; H04B 7/08; H04B 7/185;
(Continued)

(56) References Cited

U.S. PATENT DOCUMENTS 9,559,874 B2    1/2017  Han et al.
10,425,135 B2 *  9/2019  Shattil .................. H04B 7/0452
(Continued)

FOREIGN PATENT DOCUMENTS

EP      3 474 459 A1      4/2019
WO      2018/203461 A1   11/2018
WO      2019/170215 A1    9/2019

OTHER PUBLICATIONS

International Search Report and Written Opinion issued in application No. PCT/EP2020/078245, Apr. 12, 2022.
(Continued)

*Primary Examiner* — Shawkat M Ali

(57) ABSTRACT

A device includes a wireless interface configured for wirelessly transmitting a signal to a receiver; and a precoder unit configured for obtaining a first data signal to be transmitted and a second data signal to be transmitted; and for performing a first multipath-precoding of the first data signal according to a first set of paths between the device and the receiver to obtain a first precoded signal; and for performing a second multipath-precoding of the second data signal according to a second set of paths between the device and the receiver to obtain and a second precoded signal; wherein the precoder unit is configured for generating the first precoded signal and the second precoded signal such that the second precoded signal is delayed with respect to the first precoded signal at the receiver. The device is configured for transmitting the first precoded signal and the second precoded signal.

22 Claims, 16 Drawing Sheets

(58) Field of Classification Search
CPC .. H04B 7/0408; H04B 7/0456; H04B 7/1855; H04L 5/00; H04L 25/03; H04L 27/00; H04L 27/03; H04L 27/20; H04L 27/26; H04L 27/2636; H04W 24/08; H04W 76/27
USPC ............... 375/219, 260, 265, 267, 295, 316
See application file for complete search history.

(56) References Cited

U.S. PATENT DOCUMENTS

| | | | |
|---|---|---|---|
| 2015/0049792 A1* | 2/2015 | Han | H04L 25/03343 375/219 |
| 2015/0289147 A1 | 10/2015 | Lou et al. | |
| 2019/0215103 A1* | 7/2019 | Abdolee | H04L 1/0606 |
| 2019/0393936 A1 | 12/2019 | Motozuka et al. | |
| 2020/0083938 A1* | 3/2020 | Park | H04B 7/0617 |

OTHER PUBLICATIONS

Dubois, T., et al.; "Performance of time reversal precoding technique for MISO-OFDM systems;" EURASIP Journal on wireless communications and networking, Nature Publishing Group; Jan. 2013; pp. 1-16.

El-Sallabi, H., et al.; "Experimental Investigation on Time Reversal Precoding for Space-Time Focusing in Wireless Communications;" IEEE Transactions on Instrumentation and Measurement; 59; Jul. 2010; pp. 1537-1543.

Fouda, A.E., et al.; "Time-reversal techniques for MISO and MIMO wireless communication systems;" Radio Science; vol. 47; 2012; pp. 1-15.

Han, F. et al.; "Time-Reversal Division Multiple Access in Multi-Path Channels;" IEEE Global Telecommunications Conference— GLOBECOM; 2011; pp. 1-5.

Tran, H.V., et al.; "An advanced Time Reversal Precoding for SIMO Systems over Correlated Channels;" 2015; pp. 1012-1014.

Wang, B., et al.; "Green Wireless Communications: A Time-Reversal Paradigm;" IEEE Journal on Selected Areas in Communications; vol. 29; No. 8.; Sep. 2011; pp. 1698-1710.

Haustein, T.; Real Time Signal Processing for Multi-Antenna Systems and experimental Verification on a reconfigurable Hardware Test-bed; PhD Thesis; 2006; pp. 1-190; https://depositonce.tu-berlin.de/bitstream/11303/1763/1/Dokument_23.pdf.

Chopra and B.L.Evans, "Design of Sparse Filters for Channel Shortening," IEEE International Conference on Acoustics, Speech and Signal Processing, Dallas, TX, USA, Mar. 2010.

P. J. W. Melsa, R. C. Younce, and C. E. Rohrs, "Impulse response shortening for discrete multitone transceivers," IEEE Transactions on Communications, vol. 44, No. 12, pp. 1662-1672, Dec. 1996.

Lo, T., "Maximum Ratio Transmission", IEEE Transactions on Communications, , 47 , 1999, 1458-1461.

Maaz, M.; Helard, M.; Mary, P. & Liu, M., "Performance Analysis of Time-Reversal Based Precoding Schemes in MISO-OFDM Systems", IEEE 81st Vehicular Technology Conference (VTC Spring), Jan. 6, 2015.

* cited by examiner

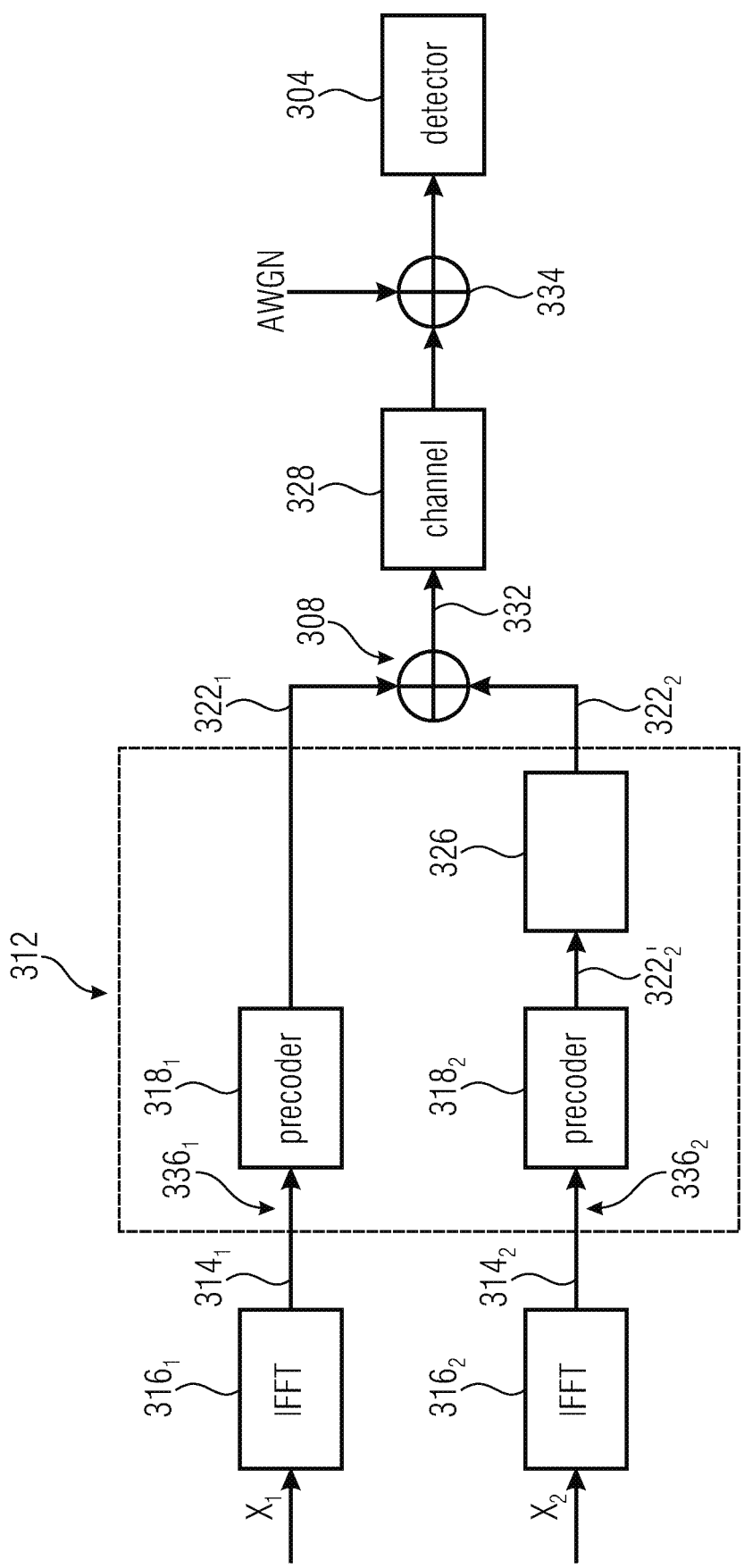

(a) CIR (office)

SPATIAL MULTIPLEXING WITH SINGLE TRANSMITTER ON WIDEBAND CHANNELS

CROSS-REFERENCE TO RELATED APPLICATIONS

This application is a continuation of copending International Application No. PCT/EP2020/078245, filed Oct. 8, 2020, which is incorporated herein by reference in its entirety, and additionally claims priority from European Application No. EP 19202795.1, filed Oct. 11, 2019, which is also incorporated herein by reference in its entirety.

The present application relates to the field of wireless communication systems or networks, more specifically to enhancements in the communication among network entities of the communication network and, in particular, to transceivers concepts for Spatial Multiplexing with a Single Transmitter on wideband channels.

BACKGROUND OF THE INVENTION

FIG. 1 (collectively FIGS. 1a and 1b) is a schematic representation of an example of a terrestrial wireless network 100 including, as is shown in FIG. 1(a), a core network 102 and one or more radio access networks $RAN_1$, $RAN_2$, ... $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. A base station may be a stationary device or a mobile device, e.g. base stations mounted on drones, vehicles, balloons, relays (virtual antennas of a base station located somewhere else) or (LEO) satellites. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

It is noted that the information in the above section is only for enhancing the understanding of the background of the invention and therefore it may contain information that does not form conventional technology that is already known to a person of ordinary skill in the art.

SUMMARY

According to an embodiment, a device may have: a wireless interface configured for wirelessly transmitting a signal to a receiver; a precoder unit configured: for obtaining a first data signal to be transmitted and a second data signal to be transmitted; and for performing a first multipath-precoding of the first data signal according to a first set of paths between the device and the receiver to obtain a first precoded signal; and for performing a second multipath-precoding of the second data signal according to a second set of paths between the device and the receiver to obtain a second precoded signal; wherein the precoder unit is configured for generating the first precoded signal and the second precoded signal such that the second precoded signal includes an offset in the delay/Doppler-domain with respect to the first precoded signal at the receiver, wherein the offset includes at least one of a delay in the time domain and a frequency shift in the Doppler domain; wherein the device is configured for transmitting the first precoded signal and the second precoded signal with a same transmit radiation characteristic of the wireless interface.

According to another embodiment, a device configured for obtaining a capability information indicating a number of offset symbols of data signals transmitted by a transmitter may have: a wireless interface configured for receiving wireless signals; a decoder unit configured for sampling a combined data signal received with the wireless interface so as to obtain a sampled representation of the combined data signal; for identifying a number of offset symbols in the sampled representation; the number of offset symbols being based on the capability information; wherein the decoder unit is configured for separating the number of offset data signals to obtain at least a first data stream and a second data stream based on the combined data signal; wherein the signals are offset in a delay/Doppler domain, wherein the offset includes at least one of a delay in the time domain and a frequency shift in the Doppler domain.

According to another embodiment, a method for operating a device may have the steps of: obtaining a first data signal to be transmitted and a second data signal to be transmitted; performing a first multipath-precoding of the first data signal according to a first set of paths between the device and the receiver to obtain a first precoded signal; performing a second multipath-precoding of the second data signal according to a second set of paths between the device and the receiver to obtain and a second precoded signal; generating the first precoded signal and the second precoded signal such that the second precoded signal includes an offset in the delay/Doppler domain with respect to the first precoded signal at the receiver, wherein the offset includes at least one of a delay in the time domain and a frequency shift in the Doppler domain; transmitting the first precoded signal and the second precoded signal with a same transmit radiation characteristic of a wireless interface.

BRIEF DESCRIPTION OF THE DRAWINGS

Embodiments of the present invention will be detailed subsequently referring to the appended drawings, in which:

FIG. 3b shows a schematic block diagram of a communication performed in the wireless communication network of FIG. 3a;

DETAILED DESCRIPTION OF THE INVENTION

Embodiments of the present invention are now described in more detail with reference to the accompanying drawings in which the same or similar elements have the same reference signs assigned.

Figure 1A:
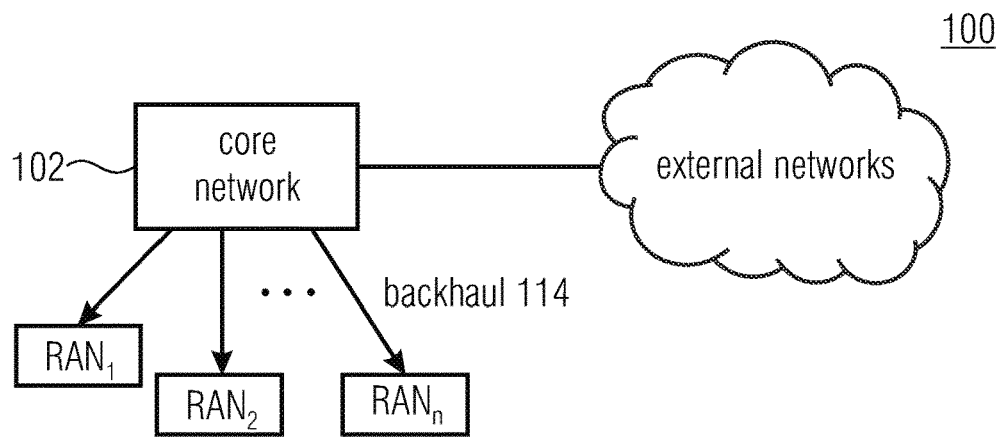
FIG. 1a shows a schematic representation of an example of a wireless communication system.
Figure 1B:
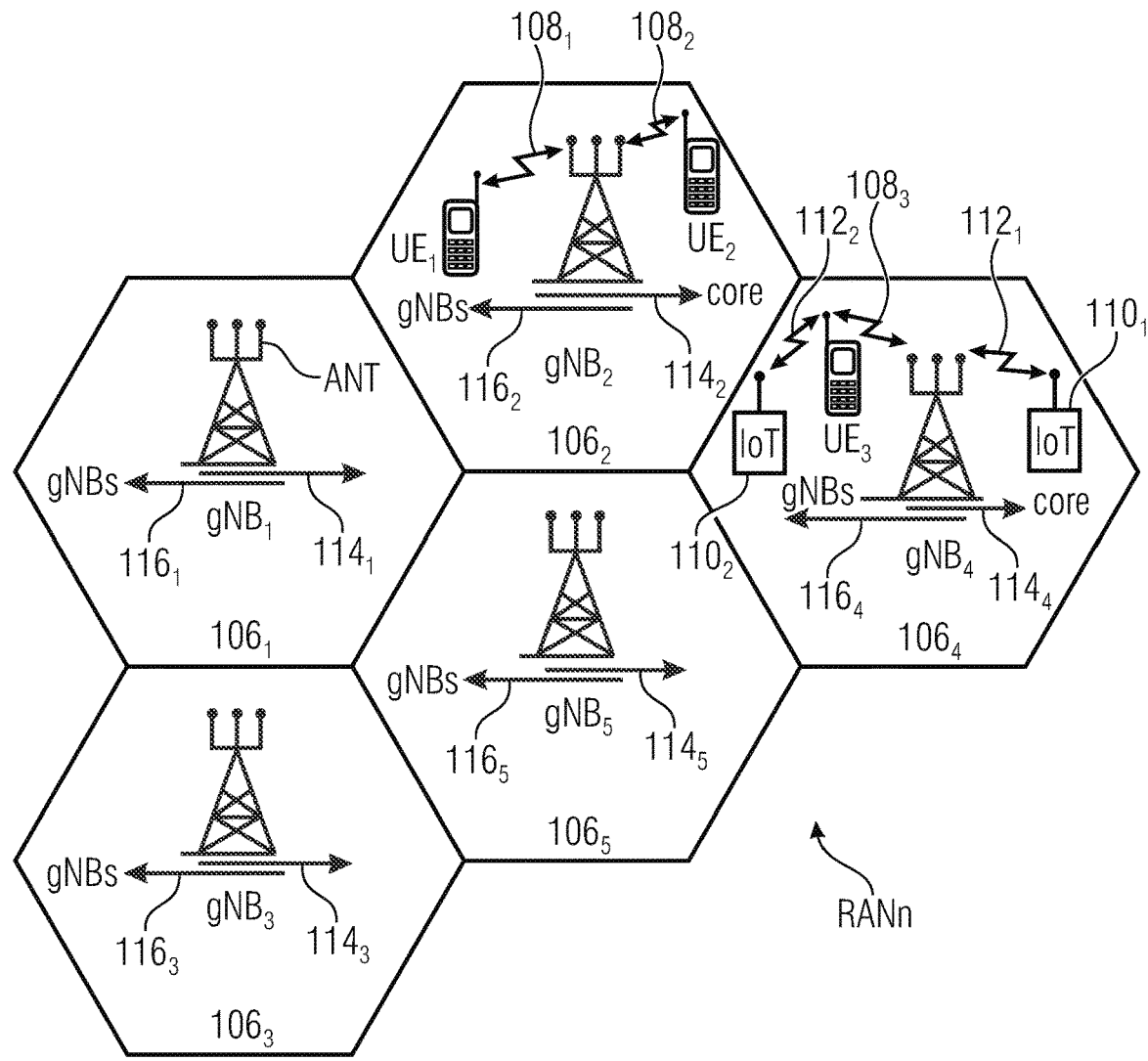
FIG. 1b shows a schematic representation of an example of a radio access network $RAN_n$.
Figure 2:
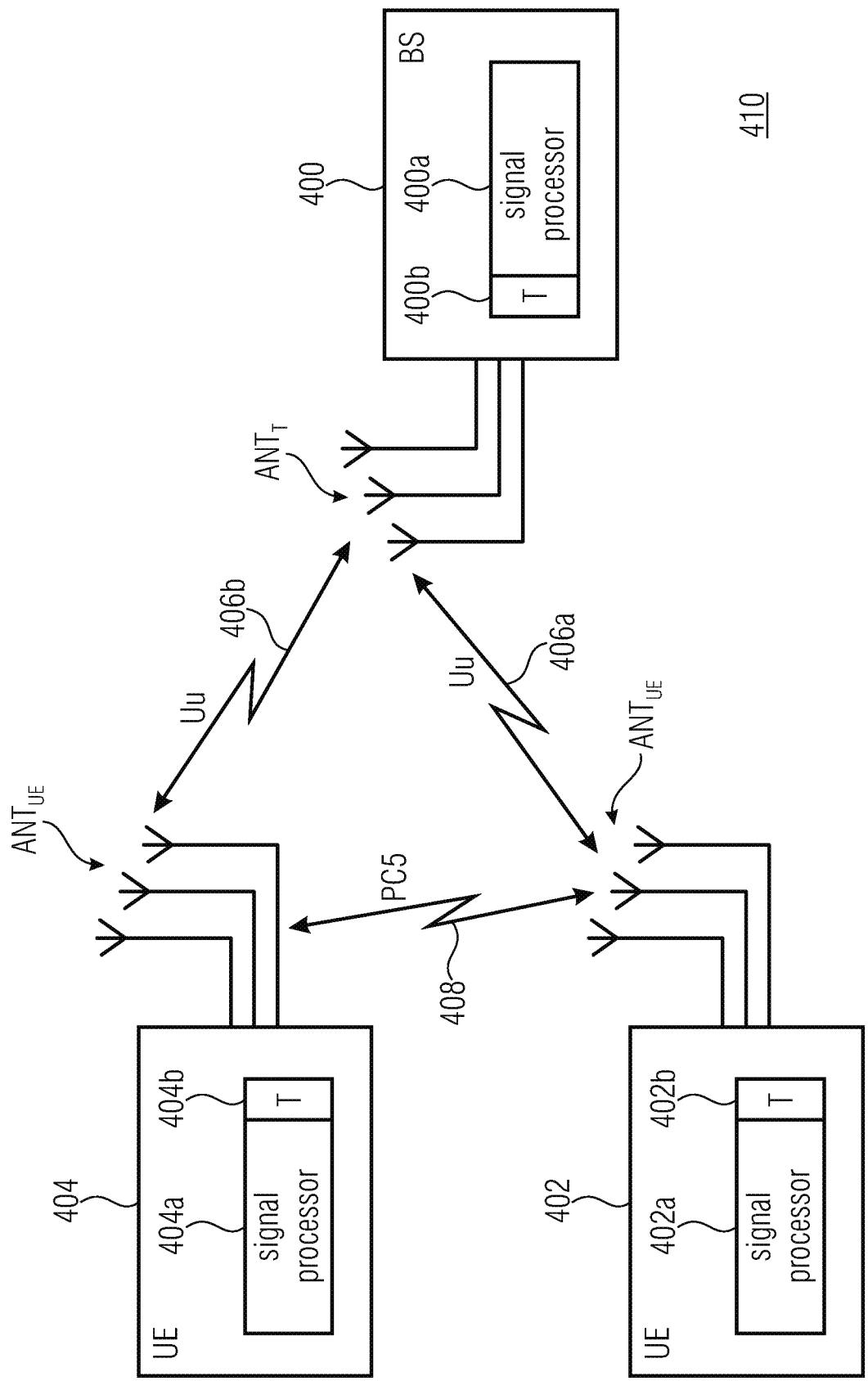
FIG. 2 is a schematic representation of a wireless communication system including a transmitter and one or more receivers.

Embodiments of the present invention may be implemented in a wireless communication system as depicted in FIG. 1 including base stations and users, like mobile terminals or IoT devices. FIG. 2 is a schematic representation of a wireless communication system including a transmitter 400, like a base station, and one or more receivers $402_1$ to $402_n$, like user devices, UEs. The transmitter 400 and the receivers 402 may communicate via one or more wireless communication links or channels 404a, 404b, 404c, like a radio link. The transmitter 400 may include one or more antennas $ANT_T$ or an antenna array having a plurality of antenna elements, a signal processor 400a and a transceiver 400b, coupled with each other. The receivers 402 include one or more antennas $ANT_R$ or an antenna array having a plurality of antennas, a signal processor $402a_1$, $402a_n$, and a transceiver $402b_1$, $402b_n$ coupled with each other. The base station 400 and the UEs 402 may communicate via respective first wireless communication links 404a and 404b, like a radio link using the Uu interface, while the UEs 402 may communicate with each other via a second wireless communication link 404c, like a radio link using the PC5 interface. When the UEs are not served by the base station, and are not be connected to a base station, for example, they are not in an RRC connected state, or, more generally, when no SL resource allocation configuration or assistance is provided by a base station, the UEs may communicate with each other over the sidelink. The system, the one or more UEs 402 and the base stations 400 may operate in accordance with the inventive teachings described herein.

In mobile communication systems, beam forming is a known technology. Beam forming relates to forming and directing one or more lobes and/or nulls along respective directions by use of a set of antenna structures, antenna panels, antenna arrays or the like. By use of beam forming, separate data signals may be transmitted along different directions, thereby exploiting advantages of multi path propagation to one or more receivers.

Embodiments described herein relate to precoding different signals to be transmitted at a same time according to different multipath components. Some embodiments are described for explanatory reasons as implementing a precoding to achieve an offset in time or a delay in the delay domain such that the signals arrive time delayed at the receiver. However, embodiments are not limited to implementing a delay but also relate to an offset in the Doppler domain which may be implemented alternatively or in addition to the delay. That is, embodiments relate to precode different signals differently so as to comprise, at the receiver, an offset in the delay/Doppler domain. Further, in case of a relative movement between transmitter and receiver, some of the paths considered for the multipath propagation may remain (almost) unchanged.

When evaluating a channel state, an evaluation being based on delays and/or Doppler shift may be more time stable when compared to phase shifts or the like.

Embodiments described herein relate to benefit from same or similar advantages without the necessity to vary the structure of shape of a beam or radiation pattern. Embodiments may be understood as simulating or emulating a multi path propagation of different data signals by implementing a an offset in the delay/Doppler domain between the data signals such that, at the receiver of the data signals, a same or at least similar result may be obtained even if the transmitter does not perform dynamic beam forming.

Embodiments relate to use a same transmit radiation characteristic for transmitting a first precoded signal and a second precoded signal. As a same transmit radiation characteristic, one may understand a same or at least similar directionality of the radiation characteristic and/or a same or at least similar polarization. A similar directionality may be understood as having a lobe that covers or points towards the receiver, which is true, for example, for an omnidirectional radiation pattern. Further, this includes slightly varying a direction or location of a formed lobe, e.g., when the maximum radiation power slightly varies while it travels in space whilst the receiver remains within the lobe. This may be understood as using a same transmission beam and/or transmission polarization whilst not excluding minor changes therein.

Figure 3A:
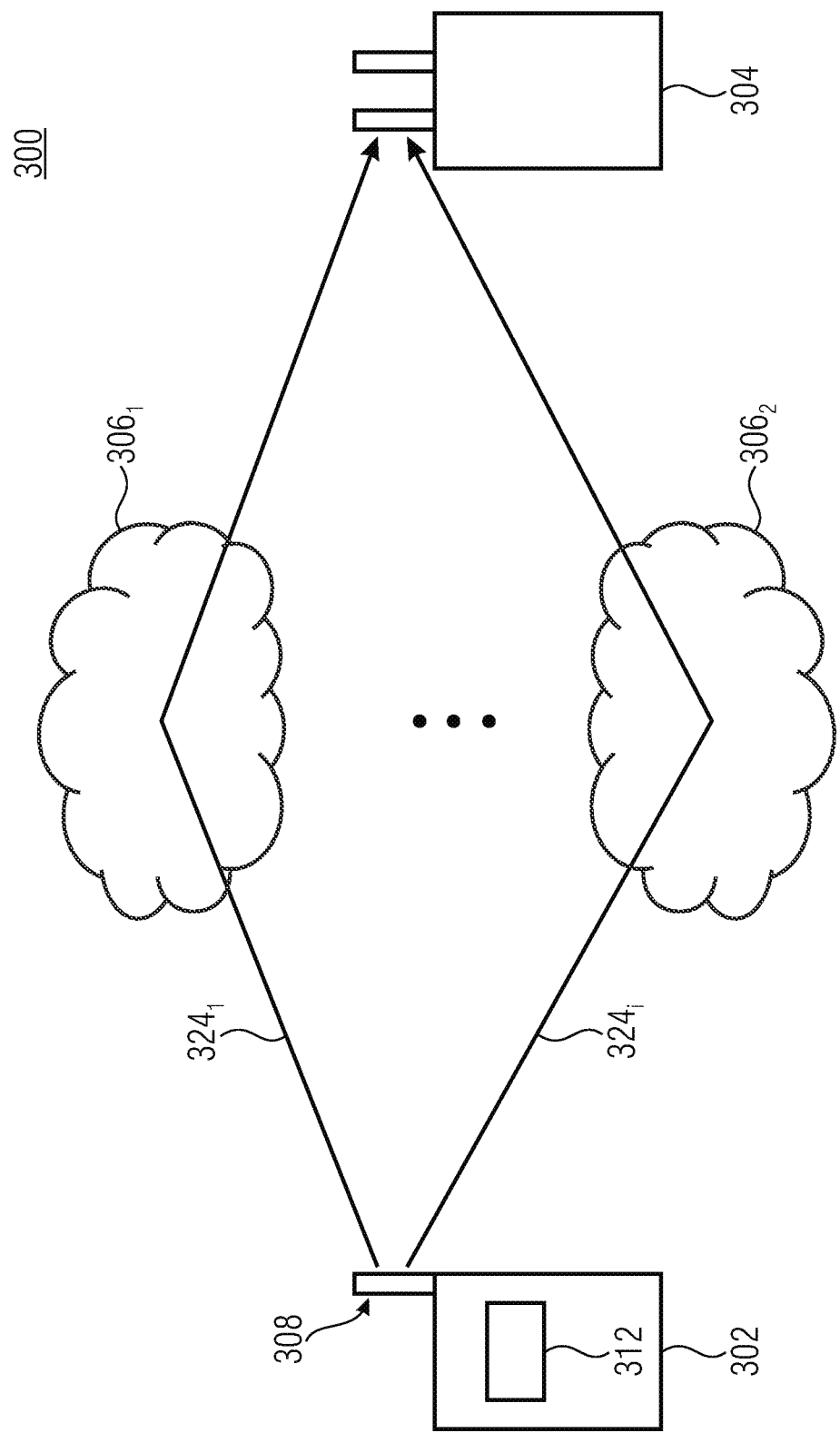
FIG. 3a shows a schematic block diagram of a wireless communication network according to an embodiment.

FIG. 3a shows a schematic block diagram of a wireless communication network according to an embodiment. The wireless communication network 300 comprises a device 302 which may be, for example, a device to be used in the wireless communication network 100, e.g., a UE, a base station, an IoT device or the like.

The device 302 may be configured to transmit signals within the wireless communication network 300, for example, so as to communicate with a receiver 304.

The receiver 304 may be implemented to exploit multi path propagation in the wireless communication network 300 which may be obtained, by different clusters $306_1$ to $306_1$ that allow for individual scattering and/or channel delays. The device 304 may be a receiving apparatus, e.g., an apparatus configured for separating spatial data streams or performing beamforming, for example, UE or a base station or the like.

The device 302 comprises a wireless interface 308. The wireless interface 308 may comprise one or more antennas, antenna elements, panels, configurations, groups of antennas and/or panels or combinations thereof. The device 302 comprises a precoder unit 312 being explained in more detail in connection with FIG. 3b.

FIG. 3b shows a schematic block diagram of a communication performed in the wireless communication network 300 of FIG. 3a. In particular, reference is made to the precoder unit 312. The precoder unit 312 is configured for obtaining data signals $314_1$ and $314_2$.

The data signals $314_1$ and $314_2$ may be obtained, for example, from transformator units $316_1$, $316_2$ respectively configured for transforming a frequency domain representation of the data signal $314_1$ to a time domain representation. Alternatively, the precoder unit 312 may receive a frequency domain representation. Optionally, the transformator units $316_1$ and/or $316_2$ may be implemented as a part of the precoder unit 312.

By use of precoder entities $318_1$, $318_2$ respectively, the data signals $314_1$ and $314_2$ may be precoded to obtain precoded data signals $322_1$ and $322_2$. The precoder entities $318_1$ and $318_2$ may be configured for precoding the respective data signal $314_1$ and $314_2$ according to a respective set of paths 324 between the device 302 and the device 306. The precoder units $318_1$ and $318_2$ may be implemented, for example, as matched filters. From a plurality of distinguishable paths, e.g., at least 2, at least 3, at least 5, at least 10 or even more, a first and a second subset may be chosen or selected, each subset having a number of at least two paths 324. That is, each precoder entity 318 is configured for implementing a multi path pre-coding of the respective data signal $314_1$, $314_2$. The signals $322_1$ and $322_2$ may be transmitted in a same or at least associated frequency range, i.e., in a manner that emulates a multipath or multibeam transmission. The sets of selected paths may be equal but may also vary with respect to at least one path up to being selected such that the set of paths are disjointed. The different set of paths may be selected such that the signals $322_1$ and $322_2$ interfere each other with a low amount or even with a minimum amount.

The precoder unit 312 may be configured for obtaining the precoded signal $322_1$ based on a first matched filter $318_1$, e.g., a filter matched to multi path components of the first set of paths. The precoder unit 312 may be configured for obtaining the precoded signal $322_2$ based on a further filter $318_2$ matched to multi path components of the second set of paths. That is, the precoder entities $318_1$ and $318_2$ may be implemented as matched filters.

The device 302 may be configured for obtaining a channel impulse response information indicating the multi path components of the first set of paths and multi path components of the second set of paths. For example, the device may receive or determine a channel impulse response providing for all of the named information. The device may obtain the information based on previously transmitted pilot/reference symbols in uplink and/or in downlink direction. Alternatively or in addition, the device may obtain the information based on information indicating a representation of the radio channel, e.g., a transformation of complex coefficients into a suitable domain to represent the radio channel, e.g., the time-domain, the frequency-domain, the time-frequency-domain, the delay/Doppler-domain and/or the spatial-domain in which an angular transmit and/or receive spectrum may be provided, e.g., based on a direction of arrival (DoA) or a direction of departure (DoD). Alternatively or in addition, the device may obtain the information based on a report of the receiver, i.e., the receiver may provide the needed information. Alternatively or in addition, the device may have an a-priori knowledge of the channel impulse response information, e.g., when having a time-invariant channel or when assuming such a channel. A report received from the receiver may be compressed by a lossless or a loss decompression. Alternatively or in addition, the report may report about a radio propagation environment, e.g., in the form of MPC (multi path components) and/or a description of a filter coefficient/transmit strategy to be applied at the transmitter using a specific precoder. The latter may be similar to a code book based precoding, where the precoding unit is told to apply a suitable precoding technique where the meaning of the codebook entries is agreed up-priory.

The precoder unit 312 is configured for generating the pre-coded signals $322_1$ and $322_2$ such that the precoded signal $322_2$ is offset in the delay/Doppler domain with respect to the precoded signal $322_1$. The precoder unit 312 may comprise an offset unit 326 to offset an output of the pre-coder entity $318_2$ in the delay/Doppler domain, e.g., by implementing an a time delay or a frequency/Doppler shift, the output represented as signal $322_2'$. Although the delay unit 326 is represented as being a part of the pre-coder unit 312, the offset unit 326 may also be a separate entity and/or may be implemented as part of the pre-coder entity $318_2$. For example, for implementing the offset, a ZAK transform may be used.

The delay obtained in the precoded signal $322_2$ relates to a delay perceivable or effective at the device 304. According to an embodiment, the precoding unit may be configured for obtaining the precoded signal $322_2$ with a delay with respect to the precoded signal $322_1$ such that the delay corresponds, within a tolerance range of, e.g., at most 30%, at most 20% or 10% or even less to one of a fraction or algebraic fraction of a symbol duration, e.g., a/b of a OFDM symbol length. Alternatively, the delay e may be, within the mentioned tolerance range, a fraction of a length of the guard interval. The integer ratios may be selected such that the delay is at least a sampling distance in the analog/digital/conversion (ADC) or an equivalent representation in the digital domain. Such an equivalent representation may be a result of filtering stages in the ADC unit, which use intermediate sampling or shifted sampling but providing a certain effective sampling towards the digital signal processing of the receiver unit. A fraction or algebraic fraction may be understood as an operation dividing a first real-valued number by a second real-valued number.

According to embodiments, a delay to be implemented may be selected so as to correspond within the tolerance range to:
an algebraic fraction of a symbol duration;
an algebraic fraction of a length of the guard interval;
an algebraic fraction or a multiple of a relevant or effective length of the channel impulse response of a channel between the device and the receiver; and
a multiple of a sampling rate of the precoder unit;

According to embodiments, an offset in the Doppler domain to be implemented may be selected so as to correspond within the tolerance range to:
an algebraic fraction of an effective doppler shift in the relevant doppler spectrum;
an algebraic fraction of a length of a relevant channel impulse response
an algebraic fraction or a multiple of a subcarrier spacing of a wireless network in which the device operates; and
an algebraic fraction of a system bandwidth of a wireless network in which the device operates The offset in the Doppler Domain may greater than a subcarrier spacing. For example, it may be at most the modulated system bandwidth or the maximum Doppler spread.

A fraction of the effective doppler shift in the relevant doppler spectrum may be equivalent to an effective channel impulse response.

That is, by delaying the signal $322_2$ with respect to the precoded signal $322_1$ in time, the device 304 may receive the signals $322_1$ and $322_2$ as if they were transmitted via different beams along different directions. A channel 328 through which a combined signal 332 being obtained by combining precoded signals $322_1$ and $322_2$ by applying both to the wireless interface 308 may further influence the signal as well as external disturbances 334 being represented as additive white Gaussian noise (AWGN) before the signal arrives at the receiver 304.

The device 302 is configured for transmitting the pre-coded signals $322_1$ and $322_2$ with the same transmit radiation characteristic of the wireless interface 308. That is, if the device 302 is able to perform beam forming, a same beam or beam forming configuration is used to transmit the precoded signals $322_1$ and $322_2$. In case, the device 302 does not perform beam forming, the implemented radiation characteristic and/or transmission characteristic is used.

Thereby, the device 302 may emulate a multi beam transmission of the signal $322_1$ and $322_2$ using a single beam or a subset of the set of beams formable with the device having the transmit radiation characteristic of the wireless interface 308.

It is to be noted that a sequence of the elements shown in FIG. 3b is not limiting in view of the embodiments. For example, instead of performing an IFFT to generate an input for the precoder, the IFFT may be implemented after the precoding or may be skipped, e.g., when the signals X1 and/or X2 are provided in the time domain. Alternatively or in addition, the offset unit 326 may be implemented prior to the precoder $318_2$ and/or prior to the transformator unit $316_2$ Spectral efficiency improvements per channel use when transmitting data between a wireless transmitter to a wireless receiver can be obtained by various means, e.g. high code rate, higher order modulation (e.g. QPSK, M-QAM), AOM (Angular Orbital Momentum) over limited distances, and spatial multiplexing (MIMO) at a system SINR>10 dB.

For the latter case, spatial multiplexing with MIMO (MUX) multiple antennas are used at the transmitter and receiver side creating a multiple input multiple output channel. The 5G radio system considers transmission in millimeter wave bands e.g. FR2 (24-52 GHz) which need so called beamforming at the transmitter and receiver side in order to achieve sufficient coverage range for the wireless link. Usually this is done with multiple array antennas integrated in an antenna panel allowing to focus transmitted or received energy by coherent excitation or reception of several or all antenna elements of the panel using a combining network with phase shifters and/or attenuators per antenna element or groups of antenna elements. Limitations of space and energy in end user devices (UE) led to agreements in 3GPP standardization for Rel-15 that a UE will transmit only with one beam at a time and will not support multiple spatial data stream to be transmitted from one UE at a time. The proposed solution in this invention disclosure enables UE/transmitting devices with one spatial beam to transmit multiple spatial streams simultaneously by mapping them to distinct delay signatures of the propagation channel connecting the location of the transmitter with the location of the receiver. By exploiting this method spectral efficiency per channel use can be increased for a particular user/UE or a group of UEs.

The proposed solution is relevant for communication systems of any kind allowing the exploitation of multipath resolution either due to a large signal bandwidth used for the transmission e.g. Nx100 MHz or 1 GHz or more, or transmission systems with a high enough signal sampling rate allowing a targeted excitation or matching of MPC of the propagation channel e.g. 100 MHz transmission bandwidth with sampling of Nx 100 MHz, at least high enough to gain a good temporal path resolution. The proposed solution is in particular relevant for the following application scenarios:

(1) Single Tx and Multiple Rx—similar to narrowband MIMO:

A communication system with transmitter equipped with a single transmit antenna and a receiver equipped with multiple antennas, where the transmitter is precoding multiple streams by a time delay precoder matched to the multipath components of the propagation channel such that the receiver can separate the signals by their spatial and/or temporal signatures.

(2) Single Tx and Single Rx—Tapped Delay Line filter to separate streams localized at T0 and T1:

A communication system with a transmitter equipped with a single transmit antenna and a single receive antenna, where the transmitter is precoding multiple streams by a time delay precoder matched to the multipath components of the propagation channel such that the receiver can separate the signals by their temporal signatures.

(3) MU-MIMO using coordinated TD-MUX filter at multiple Tx in Uplink

A communication system with multiple transmitters equipped with a single transmit antenna each and a receiver using a single or multiple receive antennas, where the transmitters are precoding a single stream or multiple streams each by time delay precoders matched to the multipath components of the extended MU-MIMO/MU-MISO propagation channel such that the receiver can separate the signals by their temporal and/or spatial signatures. The delay precoders of the multiple UE should be synchronized otherwise either a feedback mechanism for optimized delay precoder adjustment is needed between the receiver and the transmitting multiple UEs.

Depending on the fact if the receiver is equipped with an effective single receive antenna (e.g. an omni or horn antenna or an antenna array forming a receive beam) or multiple receive antenna ports the delay precoding has to be made such that the multiple streams can be separated exploiting e.g. the time domain only (single receive antennas) or the time and/or spatial domain (multiple receive antennas). Separation in spatial domain means that the same taps or their frequency equivalent narrow band channel in e.g. OFDM at different receive antennas experiences phase and/or amplitude differences allowing the application of MIMO signal processing techniques. Optionally, this may be implemented alternatively or in addition in the Downlink.

(4) Multi-TRP in Downlink (DL) to one receiver with a single Rx antenna

A communication system with distributed transmitters equipped with a single transmit antenna each and a single receive antenna at the UE in downlink (DL), where the transmitters are precoding a single or multiple streams each separately or jointly (jointly needs not just time sync between TRPs but even phase sync for coherent delay precoding—this would be similar or equivalent to coherent CoMP (Coordinated Multi-Point) in DL. When applying coherent CoMP in DL the effective channel becomes a single tap channel with a flat frequency response if done optimally. Just the SNR per OFDM subcarrier depends on the narrowband MIMO channel quality) by time delay precoders matched to the multipath components of the propagation channel such that the receiver can separate transmitted signals from the different TRPs by their temporal signatures. For this transmission scheme the precoders have to be time synchronized at least regarding to the windowing applied. Furthermore, joint or distributed power allocation can help to optimize the MUX performance. Due to the macroscopic separation of the multiple TRP or different MPC or at different access delays a richer multipath channel with potentially longer effective access delay can be exploited in the delay precoding scheme.

(5) Multi-TRP in Downlink (DL) to multiple receivers with a single or multiple Rx antennas A communication system with distributed transmitters equipped with a single transmit antenna each and receivers at the UE side in downlink (DL) with a single or multiple receive antennas, where the transmitters are precoding a single or multiple streams each separately or jointly (jointly needs not just time sync between TRPs but even phase sync for coherent delay precoding—this would be similar or equivalent to coherent CoMP in DL) by time delay precoders matched to the multipath components of the propagation channel such that the receivers can separate transmitted signals from the different TRPs by their temporal and/or spatial (multiple receivers) signatures. In this multi-user DL scenario each receiver should receive its intended signals/streams with an improved SINR compared to no delay precoding. This is achieved by delaying the signals for each UE receiver in a way allowing the effective channel taps for each UE receiver to be separable from the signal taps intended for the other UE in temporal domain by windowing and/or spatial domain by sufficient phase differences between the multiple receive antennas per UE to perform MIMO signal processing.

For this transmission scheme the precoders have to be time synchronized at least regarding to the delay windowing applied. Furthermore, joint or distributed power allocation can help to optimize the MUX performance. Due to the macroscopic separation of the multiple TRP or different MPC or at different access delays a richer multipath channel with potentially longer effective access delay can be exploited in the delay precoding scheme. Appropriate delay distribution matched to the overall channel between the multiple TRP and the multiple UE may allow an overall effective blockwise channel orthogonalization between users in DL, at least to a level that the crosswise SIR is >10 dB, which justifies spatial multiplexing.

How has this problem been solved until now?

So far MIMO needed multiple antennas at the transmit and receive side. Classical examples are:

- Narrowband single user MIMO (SU-MIMO) between a Multi-antenna transmitter and a multi-antenna receiver, all processing is done at the receiver and/or the transmitter
- Multi user MIMO (MU-MIMO) were a base station (BS) can have multiple antennas and the terminals/UE have a single antenna or multiple antennas, most of the processing is done at the receiver and/or the transmitter side equipped with multiple antennas.
- Wideband MIMO or MIMO-OFDM, the same technique as above is applied and OFDM is used to segment the wideband MIMO channel into many parallel narrowband MIMO channels without inter-channel interference (CP-OFDM subcarriers remain orthogonal even in multipath environments given moderate mobility/relative speed of Tx/Rx/reflecting objects in the propagation environment.)

Time reversal (TR) precoding was motivated due to simple processing especially on the receiver side, since only a one-tap filter is needed at the detector side. The idea example of time-reversal precoding is that the conjugate inverse of the tap-delay channel is used as a precoder. Thus, the effective channel observed by the receiver is the autocorrelation function of the channel, due to the convolution of the channel with its conjugate inverse. However, the precoding can also be done in the frequency domain, which results in an OFDM system where a power scaled conjugate of each sub-channel is used as a precoder, similar to MRT precoding [Lo99]

- TR precoding in scientific literature:
  In [EKPP10] an experimental investigation of TR precoding is shown, demonstrating it practicability on measurements. Key facts: 250 MHz bandwidth at 2.45 GHz center frequency. See FIGS. 6a-d for the effect of TR precoding on the channel impulse response (CIR). SU-MIMO, MU-MIMO
  In [WWH+11] also shows experimental results for 380 MHz bandwidth at 680 MHz center frequency (spanning 490 MHz to 870 MHz). The application of time-reversal division multiplexing (TRDM) is introduced as a text paragraph based on [HYW+11], however only in the context of multiple users that can be differentiated by the uncorrelated tap-delay profiles or channel responses.
  In [HYW+11] the time-reversal division multiple access scheme in multi-path channels has been introduced. Again, multiple users are considered in the case of a single antenna and therefore our idea clearly differentiates from [HYW+11].
  In [FTY12] TR precoding is applied to MISO and MIMO systems
  In [DHCG13] and [MHML15] a MISO/MIMO OFDM precoding scheme is considered
  In [TH15] a SIMO system is considered. A new TR precoder is proposed based on the receive covariance matrix of a multiple antenna receiver. According to the equations in [TH15], the number of data streams that can be transmitted is equal to the number of receive antennas. W.r.t. to the invention it is clarified that the scheme in [TH15] it is not possible to transmit more than one stream to a receiver with a single antenna, thus the invention is not covered by [TH15]. The TR transmission scheme is taken from [WWH+11].

- TR precoding in patent literature:
  [HL17] with title "Multiuser time-reversal division multiple access uplink system with parallel interference cancellation"
  The first claim is based on multiple users so no conflict with our proposed idea.

Additional notes:

With subcarrier bandwidth $B^{(SC)}$, e.g. $B^{(SC)}=15$ kHz as the "standard" LTE configuration, we have a symbol rate/duration of $T^{(SY)}=1/B^{(SC)}$. If the symbol rate $T^{(SY)}$ is larger than the delay $\tau_L$ of the CIR, such that $T^{(SY)} > \tau_L$, ISI is avoided. Note, that $\tau_L$ is the delay of the L-th path, that is the path with the maximum delay where the amplitude is above a certain threshold, e.g. thermal+ receiver noise. In the examples from literature, the symbol rate is much larger than the CIR such that $T^{(SY)} \gg \tau_L$ is a valid assumption for 5G OFDM systems.

Rate back-off factor: Symbol transmission rate is different from the symbol rate given by the bandwidth, usually in large bandwidth systems the symbol transmission rate is less than the symbol rate given by the bandwidth in order to avoid ISI.

Aim: Transmit two symbols within the CIR or in other words, within the symbol duration $T^{(SY)}$ assuming an OFDM system→Corresponds to an rate back-off factor ½.

Figure 4A:
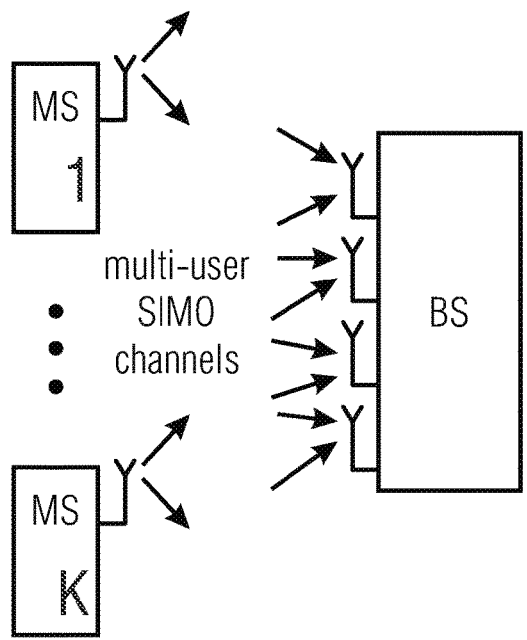
FIG. 4a shows a schematic representation of a Multi-User Medium Access Control in a multi-user (MU)—single input multiple output (SIMO) configuration.
Figure 4B:
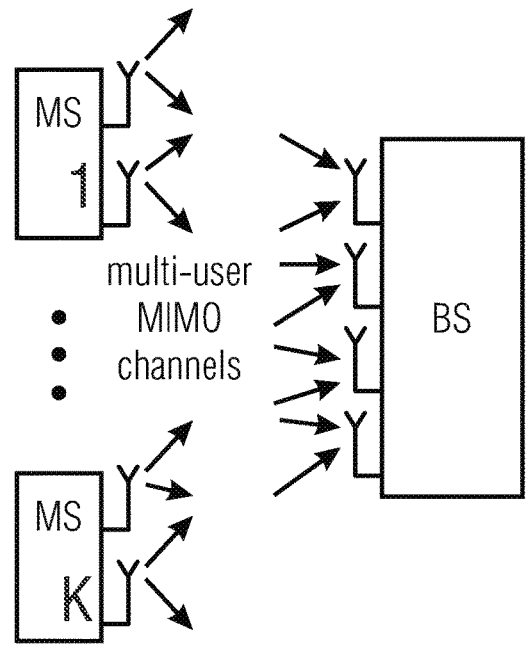
FIG. 4b shows a schematic representation of a Multi-User multiple input multiple output (MIMO) MAC.
Figure 5A:
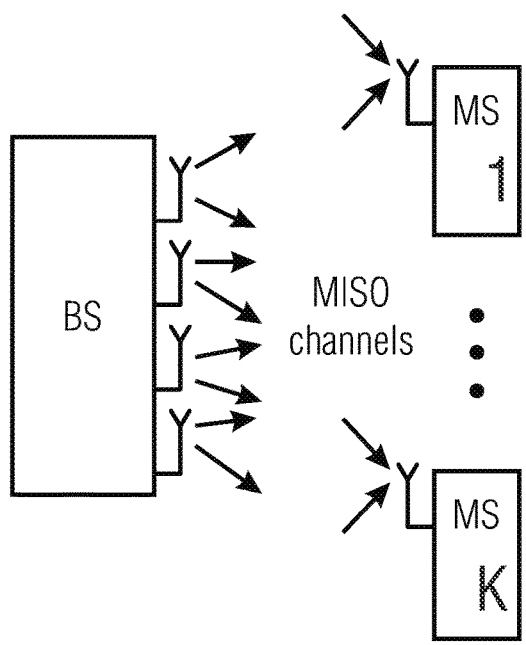
FIG. 5a shows a schematic representation of a Multi-User-Broadcast-Channel in a MU-MISO (multiple input single output) broadcast.
Figure 5B:
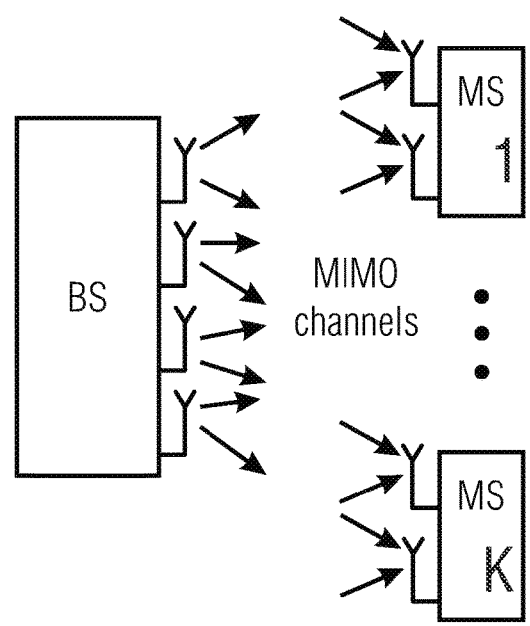
FIG. 5b shows a schematic representation of a MU-MIMO broadcast.

In connection with this, FIG. 4a shows a Multi-User Medium Access Control in a multi-user (MU)—single input multiple output (SIMO) configuration, whilst FIG. 4b shows a MU-MIMO MAC (medium access control). Further, FIG. 5a shows a Multi-User-BROADCAST-CHANNEL in a MU—MISO (multiple input single output) broadcast, whilst FIG. 5b shows a MU—MIMO broadcast.

Figure 6B:
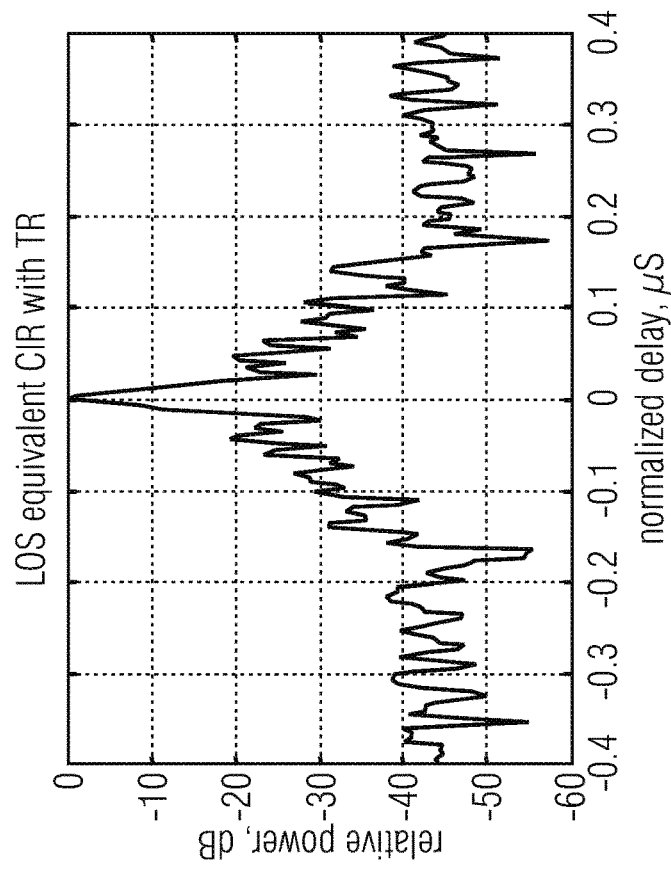
FIGS. 6a-6f show schematic representation of energy in line of sight (LOS) and non-LOS paths.
Figure 6A:
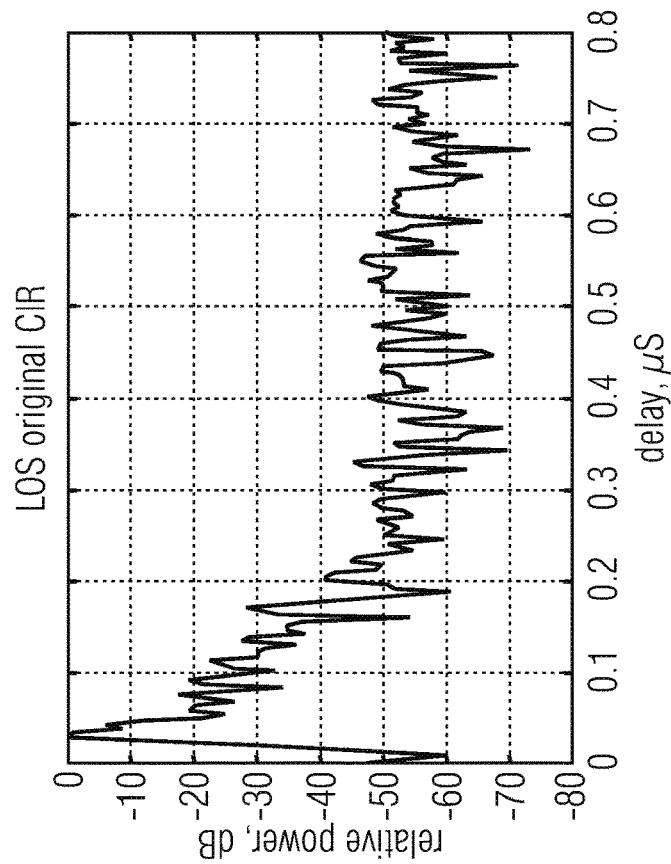
Figure 6D:
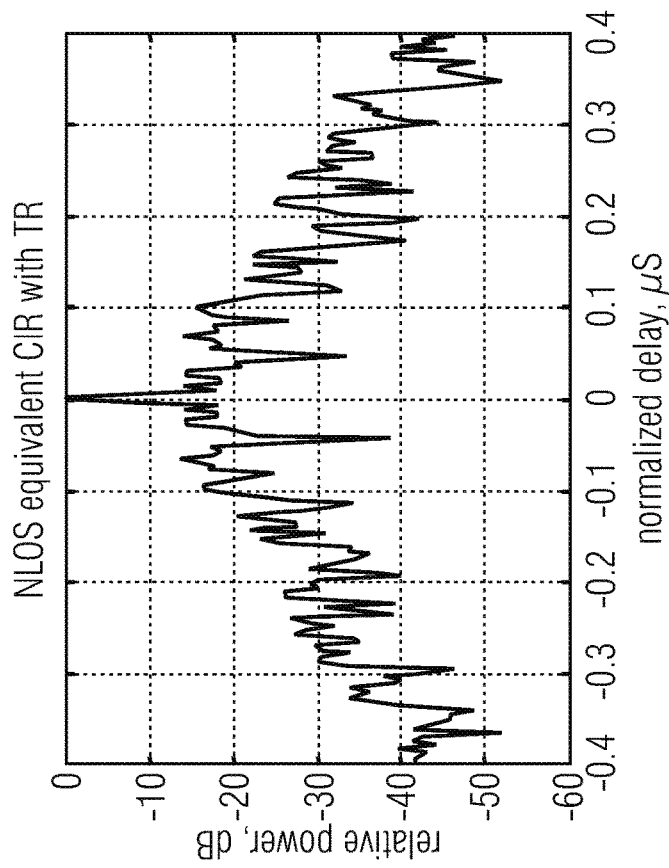
Figure 6C:
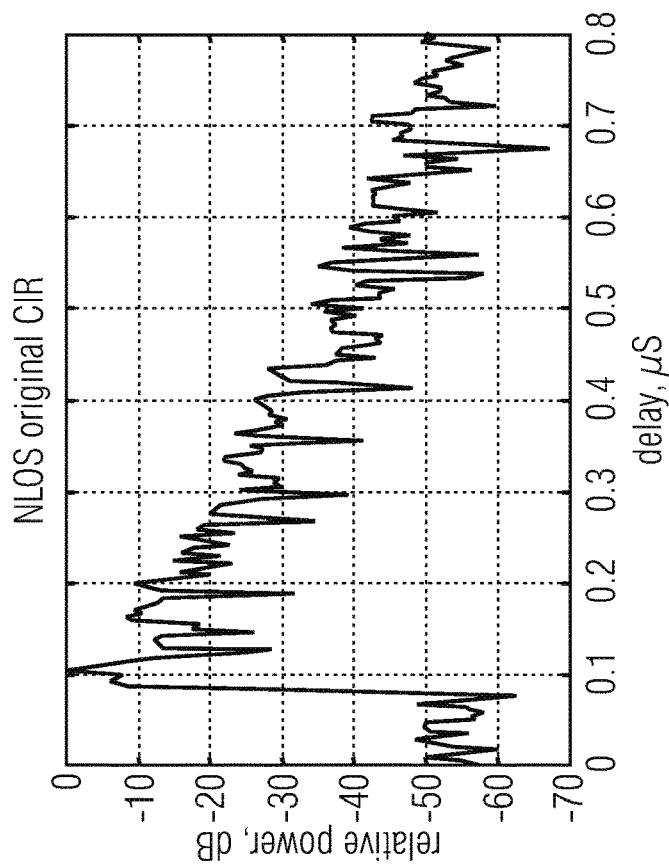
Figure 6E:
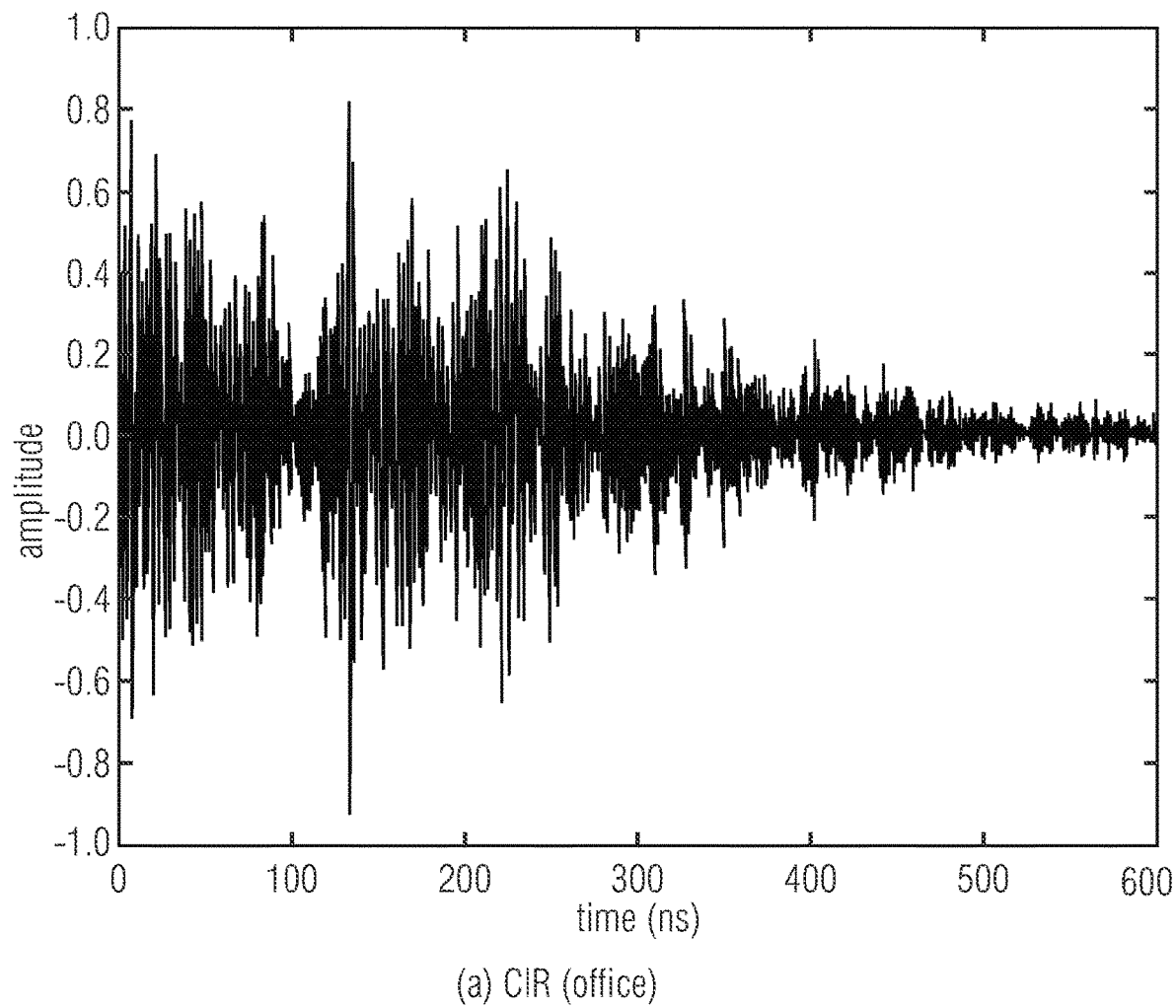
Figure 6F:
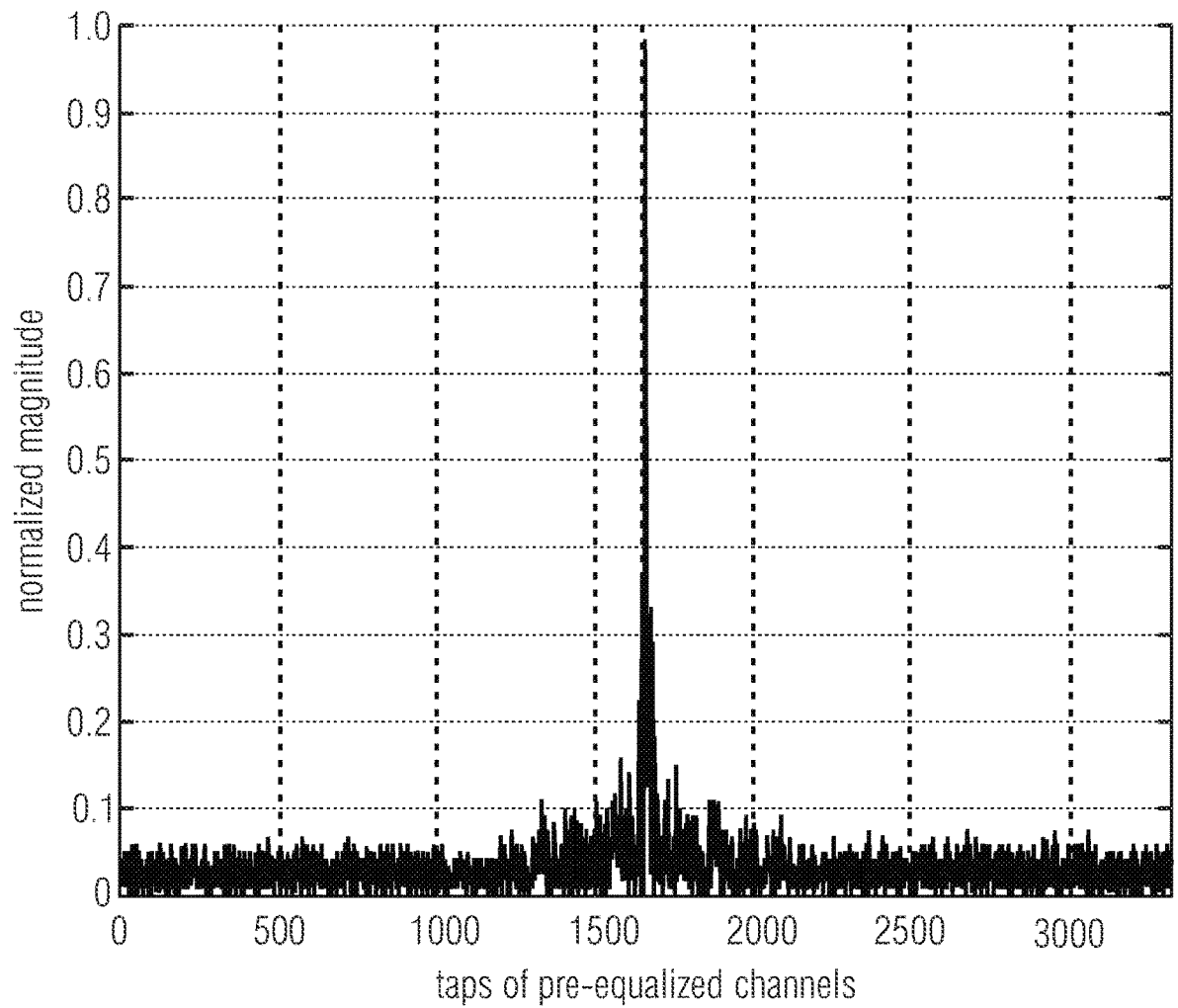

Further, FIG. 6a shows an example diagram illustrating a relative power on the ordinate over a delay in μs to draw line-of-sight path (LOS) having an original CIR. FIG. 6b shows a LOS equivalent CIR with TR (time reversal) precoding. FIG. 6c shows a corresponding non-LOS (NLOS) equivalent CIR with TR precoding, whilst FIG. 6d shows a NLOS equivalent CIR with TR. FIG. 6e shows a schematic representation of a CIR taken in an example office, wherein FIG. 6f shows taps of pre-equalized channels.

According to an embodiment, the precoder unit 312 is configured for obtaining a channel information relating to a multi path propagation of a signal from the device to the receiver. The precoder unit 312, the device 302 respectively may be configured for selecting the respective set of paths from the multi path propagation. For example, this multi-path propagation can be derived from the reference signals (RS) at the device 302 itself or by feedback from the other communication link (base station) reporting channel state information (CSI) to the device 302. That is, the device 302 may determine the respective information itself or may receive such information already determined at the communication partner.

According to an embodiment, the interface 308 may be configured for forming at least one beam of a set of beams using a beam forming technique. The device 302 may be configured for using a single beam of the set of beams or a subset of the set of beams for transmitting both, the precoded signal $322_1$ and the precoded signal $322_2$. Using a set of beams may be implemented by using a beam which is a superposition of two beams belonging to the set of beams. Basically, the transmit radiation characteristic may be understood as a beam or a combination of beams forming a new, combined or superimposed beam. That is the single beam may be an individual beam or a superposition of beams.

According to an embodiment and as shown in FIG. 3b, the precoding unit 312 may comprise two or more branches $336_1$, $336_2$, each branch 336 configured for obtaining the respective data signal $314_1$, $314_2$ and for generating the respective precoded signal $322_1$, $322_2$/$322_2$. At least one path 336 may comprise a respective offset unit 326. According to an embodiment, offset units in different branches 336 may provide for a different delay of the signal. The offset unit 326 may be implemented, for example, as a delay filter.

The time delay/frequency shift implemented by the offset unit 326 with regard to an undelayed/unshifted version or a less delayed/shifted version, the amount of time/frequency difference between the precoded signals $322_1$ and $322_2$ may be set based on different considerations. Considering the example of a time delay, the delay may be at most a maximum channel delay between the device 302 and the receiver 304. Alternatively, the delay may be set to be at most a duration of a symbol of the precoded signal $322_1$ and/or $322_2$, the symbol duration being possibly longer than the channel delay.

A delay of the precoded signal $322_2$ with respect to the precoded signal $322_1$ may be at most a symbol sampling rate at the receiver 304. Background for choosing such a delay may be seen in that the receiver samples the received signal with a certain sampling rate/bandwidth and the effective signal representation in digital time domain after the analog-digital-conversion (ADC) may or should allow to create a digital time delay structure. In principle, such delay structures may be realized in analog domain as well, nevertheless, decisions on delays and values for combinations of the signal may usually be performed in a digital domain. Values for the symbol sampling rate at the receiver 304 may be known at the device 302.

Embodiments relate to: In case of more than 1 receive antenna and a separation of the antennas beyond their narrowband coherence distance the receiver can distinguish the multiple streams by the spatial signature creating an effective MIMO channel as if the transmitter would have transmitted different streams from different antennas of with different beams just by using the delay precoding technique described in this invention disclosure. Narrowband coherence distance means the physical antenna spacing w.r.t. the wavelength such that the phase difference is below a certain threshold.

In connection with application scenario 1.) the device 302 may be configured for generating the signal 332, $322_2$ respectively such that the bandwidth being occupied by the signal is lower when compared to an achievable or allowed conceivable bandwidth. Alternatively or in addition, the receiver 304 may be configured for sampling the received combined data signal to resolve the transmitted signals $322_1$ and $322_2$ to obtain the respective data streams with a lower signal bandwidth then an achievable signal bandwidth. For example, the described high resolution delay precoding may be implemented at moderate system bandwidth of, for example, 100 MHz or below.

In connection with application scenario 4.) a.), "taps" may be understood as a concentration of different signal taps within a time delay window. It is not necessary that the signals are ideally matched to the channel delay and form an almost single tap surrounded by a decay of nearby echoes as shown, for example, in FIG. 7.

Embodiments may relate to a time delay/Doppler (DD) precoder design.

The design of the Delay/Doppler Precoder (DDP) may follow the following criteria: Data streams for spatial multiplexing should be precoded such that they are effectively mapped onto:

Specific delay clusters in propagation environment (a delay cluster are paths which have a similar delay length given a certain time window) or/and Selected multi path components (MPC) with significant power visible in the power delay/Doppler profile and/or Selected taps with suitable (time) distance to each other, separating all "not DD matched" power components well enough from the targeted receive signal window in which the useful power should be concentrated.

In the following paragraphs some potential implementations of a time delay precoder are given in order to give practical insights into the feasibility of the proposed technique. Exemplarily the examples are described in detail for a Delay component implementation. I analogy the same mechanism can be applied for the Doppler component implementation caused by relative movements of the transmitter, the receiver or reflecting object in the propagation environment resulting in a shift of the carrier frequency and therefore energy spill from OFDM subcarriers to adjacent subcarriers. By applying a path specific Doppler compensation, the signals at the receiver are effectively perceived as Doppler free or at least with a reduced Doppler spread.

Example 1: Single Transmit Antenna and Single Receive Antenna, Precoder Design Consider a wideband wireless communication system with a transmitter (Tx) and a receiver (Rx) as shown in FIG. 3b. The Tx and Rx are equipped with a single antenna, respectively. At the Tx, a data stream $X_1 = [x_{11}, x_{12}, \ldots, x_{1N}]^T$ is passed to a precoder for transmission over the wireless wideband channel $h = [h_1, h_2, \ldots, h_L]T$, where h is the channel vector with L channel taps. A second data stream $X_2 = [x_{21}, x_{22}, \ldots, x_{2N}]^T$ is also processed in the same manner as the first data stream but its outcoming signal after precoding is delayed for a certain time for transmission.

We assume that the system bandwidth is so wide such that many of the wireless multipath components can be resolved. The precoder described above is applied such that the effective channel in the system will have a major part of the energy aggregated near the main peak/tap observed from the receiver side and the remaining energy components in the delay window are significantly reduced by spreading them over the time domain. In other words, if the channel is described by a tapped delay line model, the effective channel after applying a precoder results in one major tap of a certain delay with much higher power than the other taps. In such system, the precoder can be designed to be like a matched filter to the channel impulse response (time reversed and phase conjugated version of the channel impulse response), i.e., $p = [h_{-L}^*, h_{-L+1}^*, \ldots, h_1^*]^T$. The effective channel is then given by a convolution of the channel impulse response and the precoder, i.e., $g = h \otimes p = [g_{-L}, g_{-L+1}, \ldots, g_L]^T$, where g is the effective channel with maximum tap power on $g_1$. An example of the resulting effective channel is shown in FIG. 7, where the main tap power is about 15 dB above the other taps.

Note that in high SNR conditions, it is desirable to transmit two or more data streams rather than a single data stream to achieve higher system throughput for a given sum transmit power over all data streams. In this case, the above scheme enables us to transmit two data streams, each with half of the transmit power to achieve higher throughput than the conventional single stream transmission scheme.

Figure 7:
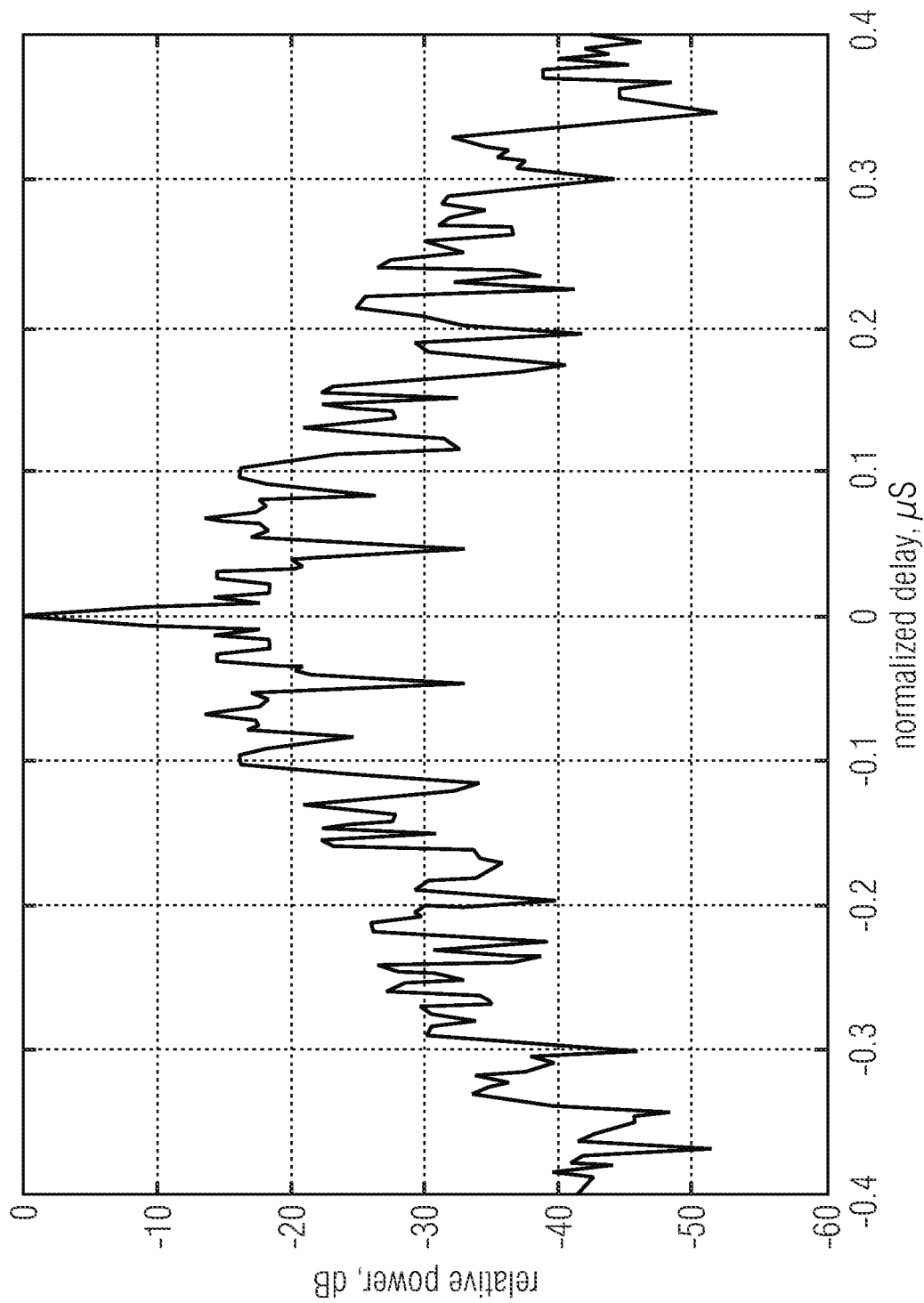
FIG. 7 shows a schematic representation of a normalized power in a signal being ideally matched to the channel according to an embodiment.
Figure 8:
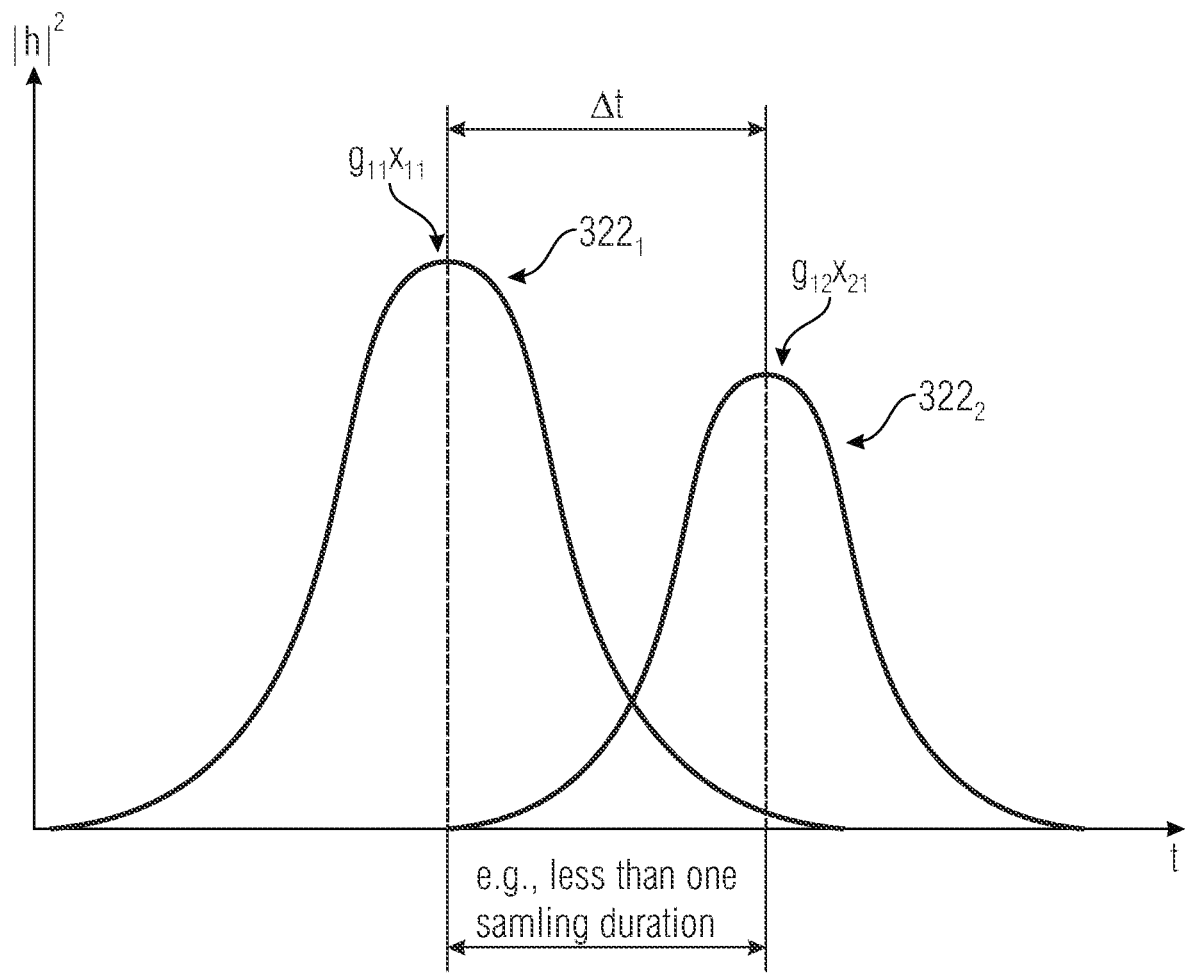
FIG. 8 shows a schematic representation of a normalized power in a signal having two delayed components according to an embodiment.

FIG. 7 is an example of the effective channel after applying a matched filter to the channel impulse response as shown in [EKPP10]. In FIG. 3b, the second data stream (X2) is delayed for a certain duration with respect to the first data stream. The delay is also a designed parameter which is depicted in FIG. 3b as a functional block. In general, the delay can be chosen, for example, to the less than the sampling duration, such that the peak power of the effective channel experienced by the second data stream happened on less than one sampling duration later than of the first data stream. This is shown, for example, in FIG. 8 where, for simplicity, the delay is to be assumed to be half of the sampling duration. Let $g_1$ q denote the tap $g_1$ with the highest power for the qth data stream, the received signal at two consecutive half sampling durations can be written as:

$$\begin{bmatrix} y_1 \\ y_2 \end{bmatrix} = \begin{bmatrix} g_{11} & g_{l2} \\ g_{f1} & g_{l2} \end{bmatrix} \cdot \begin{bmatrix} x_{11} \\ x_{21} \end{bmatrix} + \begin{bmatrix} n_1 \\ n_2 \end{bmatrix},$$

where $y=[y_1,y_2]^T$ and $n=[n_1,n_2]^T$ denote the receive signal and noise for two consecutive half sampling duration, respectively; $g_{f1}$ and $g_{f2}$ are the effective channel coefficients for the first and the second data streams resulting in inter-symbol interference as shown. Thereby, given the received signal y(signal 332 after it has passed the channel) and estimated channel taps, the data streams $x_{11}$ and $x_{21}$ can be straight forward detected using a conventional MMSE (minimum mean squared error) receiver.

That is, the device 302 may be configured for transmitting the precoded signals $322_1$ and $322_2$ as a signal being a superposition of the precoded signals in the time domain. That is, at least parts of the respective precoded signals $322_1$ and $322_2$ may be transmitted at a same instance of time which is different when compared to transmitting different precoded signals in different slots, time intervals or the like.

From a single transmit antenna and a single receive antenna, the embodiments may also relate to a single transmit antenna and multiple receive antennas. The extension to multiple receive antennas in the above scheme is straightforward. For simplicity, we assume two receive antennas. Follow the notation in Example 1 and let the superscript (n) denote the nth receive antenna. The received signal at two sampling duration by two receive antennas can be written as $$\begin{bmatrix} y_1^{(1)} \\ y_2^{(1)} \\ y_1^{(2)} \\ y_2^{(2)} \end{bmatrix} = \begin{bmatrix} g_{11}^{(1)} & g_{l2}^{(1)} \\ g_{f1}^{(1)} & g_{l2}^{(1)} \\ g_{11}^{(2)} & g_{l2}^{(2)} \\ g_{f1}^{(2)} & g_{l2}^{(2)} \end{bmatrix} \cdot \begin{bmatrix} x_{11} \\ x_{21} \end{bmatrix} + \begin{bmatrix} n_1^{(1)} \\ n_2^{(1)} \\ n_1^{(2)} \\ n_2^{(2)} \end{bmatrix}.$$

Given the received signal and the estimated channel taps, the transmitted data streams can be estimated by using a conventional MMSE receiver.

Figure 9:
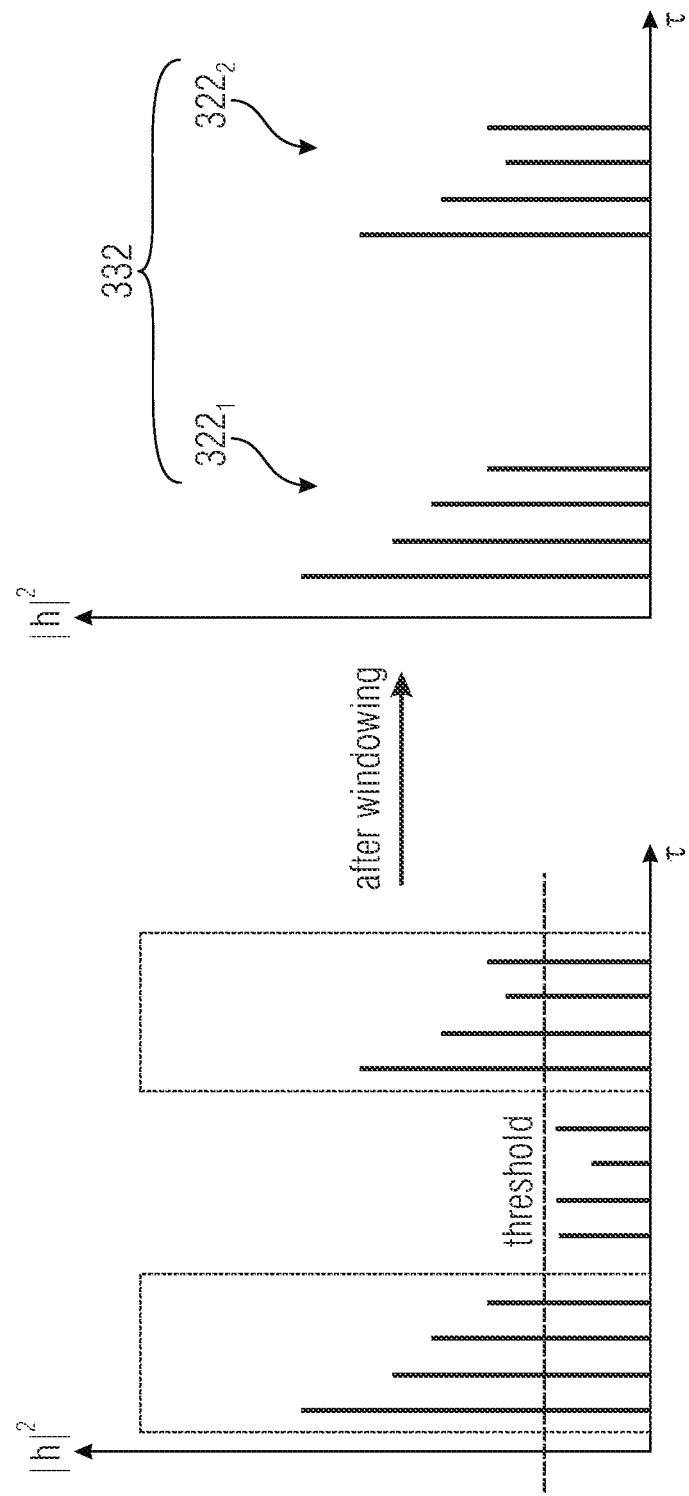
FIG. 9 shows a schematic representation of a transmitter-side windowing for shortening the applied channel impulse response according to an embodiment.

According to an embodiment, the precoding unit is configured for applying a windowing for precoding the data signal $314_1$ and/or $314_2$. This may allow for reducing a computational complexity by limiting the precoded signal $322_1$ and/or $322_2$ to taps or power portions that comprise a significant amount of energy whilst filtering other portions comprising an energy level being below a threshold value as shown in FIG. 9.

In other words, an example relates to a precoder design using windowing. In example 1, the precoder was designed to be a matched filter to the channel impulse response. If the channel impulse response is very long, the computational complexity for the precoder can become very high. In order to reduce complexity, windowing can be applied to the taps with power higher than a certain threshold as shown in FIG. 9. The precoder is then designed to match the channel taps surviving after windowing. In this way, the taps with high power are enhanced and the taps outside the window are suppressed.

Example 4: Precoder Design Using Channel Shortening Filter

The goal of a channel shortening filter is to compress the channel energy into a short time duration of Ls samples. In other words, that is to produce an effective channel, i.e., the cascade of a channel and a channel shortening filter, which will have most of the energy compacted into fewer adjacent taps. The performance metric of the channel shortening filter can be designed as the ratio of the channel energy inside the shortened window of length Ls samples to the channel energy outside this window, which is called shortened SNR (SSNR).

The energy of the effective channel can be divided into two components, the signal energy and interference energy. The signal energy component is the energy of the channel within the target shortening window. The interference energy is the energy of the channel outside the target shortening window. Let $g[g_\Delta, g_{\Delta+1}, \ldots, g_L]^T$ denote the effective channel. The signal energy component of the channel $g_{win}$ and the interference energy component of the channel $g_{wall}$ can be written as $$g_{win}=g(\Delta,\Delta+1,\ldots,L_s)$$

and $$g_{wall}=g(L_{s+1},\ldots,L),$$

where $\Delta$ is the equalization delay. The output SSNR of the effective channel response can be written as $$SSNR = \frac{E_s}{E_I} = \frac{g_{win}^H g_{win}}{g_{wall}^H g_{wall}}.$$

SSNR maximization filter can be solved using the generalized eigenvalue solution which is given by [MYR96] [CE10]

$$p_{opt}=\sqrt{A}^T q_{min}.$$

Figure 10:
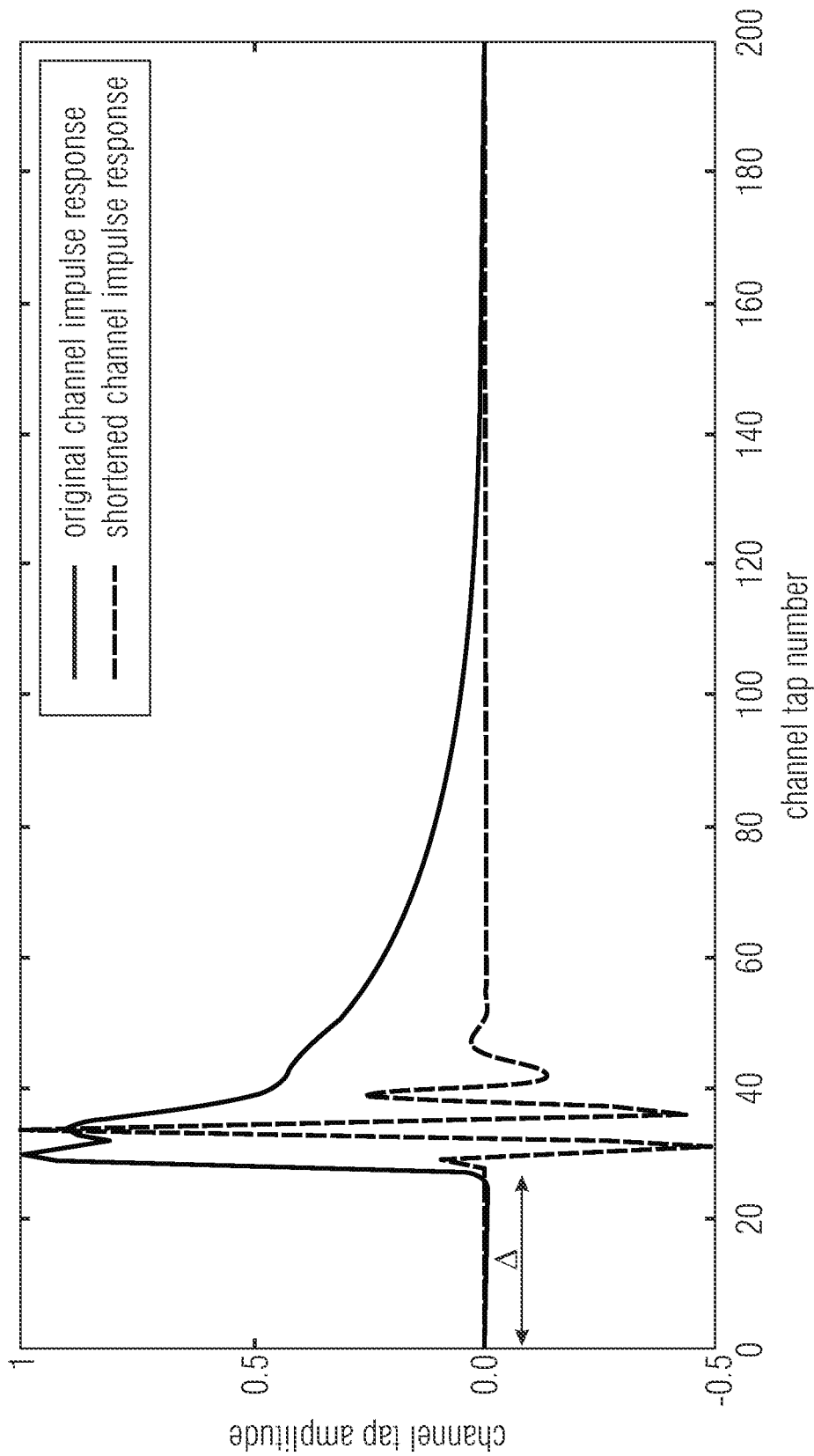
FIG. 10 shows an example of an original and shortened channel impulse response based on the technique of FIG. 9 according to an embodiment.

An example of the original and shortened channel impulse response (effective channel) is shown in FIG. 10 of original channel impulse response and the shortened channel impulse response.

Beside the report about the channel information and/or the multi path components, embodiments may relate to a signaling between the transmitter 302 and the receiver 304. For example, one of the entities may determine that the channel is good enough (e.g., SNR above a certain threshold, e.g., 10 db) that one or more additional signals may be transmitted via a delay/Doppler precoding as described in connection with FIG. 3a and FIG. 3b. For example, the device may be configured for transmitting a capability information indicating that the device 302 is configured for transmitting at least two precoded signals with a same transmit radiation characteristic of the wireless interface 308. For example, such a capability information may be a part of a CIR report. The device 302 may be configured for transmitting the capability information so as to comprise information relating to at least one of a location, a scenario and a mobility cluster of the device. Alternatively or in addition, the device 302 may be configured for receiving capability information indicating that the receiver is capable of decoding a combination of the precoded signals $322_1$, $322_2$ and possibly additional precoded signals. The device 302 may be configured for selecting either to transmit the combination of precoded signals or not based on the capability information. That is, if the device is informed that the receiver may decode the simultaneous transmission (within the applied delay) of the precoded signals, and if the channel comprises a quality being at least the quality threshold, the device 302 may implement the described precoding. Alternatively or in addition, the device 302 may inform the receiver 304 directly or indirectly that it is capable of performing the described precoding. Upon a request or a kind of allowance, the device 302 may implement the described precoding. When receiving a request information indicating that the device is requested to transmit the precoded signals 322, the device may be configured for operating according to the request. The request information may be generated by the receiver 304 and/or by a different node, e.g., a network coordinator or the like.

The device may be configured for obtaining a channel information. The channel information may comprise a channel state information (CSI) indicating, for example, a presence of one or more multi-path components (MPC) between the device and the receiver. The channel information may comprise a channel quality information, for example in connection with each or at least a part of the channels identified by the channel state information. The channel information may indicate a channel quality between the device and the receiver. The channel information may indicate that a channel quality is above a channel quality threshold. The device may be configured for transmitting the combination of precoded signals $322_1$, $322_2$ and, optionally, additional precoded signals, with a same transmit radiation characteristic of the wireless interface 308 based on the channel quality information. The CSI thus may be sufficient or helpful to make a decision if two streams mapped onto the MPCs can be successfully transferred or not.

Whilst making reference again to FIG. 8, two or even a higher number of precoded signals may be transmitted whilst using a respective, unambiguous delay to other precoded signals. For example, a third precoded signal being based on a third path between the device and the receiver may comprise an offset in time, i.e., a delay, which is different than the delay applied in the offset unit 326. In a combined signal, a respective component being based on the precoded signals may therefore be also delayed with respect to each other. The device 302 may be configured for transmitting a delay information indicating a time delay between at least symbols of the precoded signal $322_1$ and the precoded signal $322_2$, i.e., an information indicating the applied delay Δt being implemented by the offset unit 326.

The delay information, e.g., $\tau_{1,2}$, may indicated, at the receiver, at which location it shall search or detect peaks in the signal, thereby enhancing the decoding. Such an enhancement may be especially advantageous in scenarios where a high load or traffic occurs in the channel which may lead to a high amount of interference, in particular in unlicensed bands.

The device 302 may comprise a single transmit antenna, a single transmit array or a single effective antenna or antenna port for transmitting the wireless signals in a multiplex node. That is, although comprising only one single antenna, the device 302 may nevertheless be configured for performing a multiple input multiple output communication mode/spatial data stream multiplexing.

In other words, embodiments relate to signaling needed conditions:
1. Channel impulse response (CIR), advantageously with high resolution in time (delay) domain, has to be obtained and to be available at the transmitter side
    This can be obtained from previously transmitted pilots, e.g. in 5G NR this can be SRS in uplink or CSI-RS in downlink or DM-RS in uplink or downlink directions.
    In 5G NR or other systems the channel is maybe estimated in the frequency domain, e.g. a complex coefficients per OFDM subcarrier, and the channel impulse response is obtained by transformation into the time-domain, e.g. by a FFT/DFT
    uplink/downlink pilots should be configured to cover as much bandwidth as possible, as higher bandwidth increases the time/delay resolution of the estimated CIR.
    Either the receiver needs to report the CIR or the transmitter estimates the CIR utilizing channel properties e.g. channel reciprocity or any other reconstruction such as detection of main scatterers or $2^{nd}$-order statistics plus additional signal processing or a-priori knowledge in the CIR such as fixed-wireless access or backhaul
    The CIR report may be compressed in a lossless or lossy fashion such as e.g. using codebooks for the different channel components (time, space, delay, doppler, frequency)
2. Delay-multiplexing capability—The RX and/or the TX can inform each other whether they are delay multiplexing capable or not.
    A new signaling is needed for this information. This can be signaled by a new indicator e.g. by new UE capability or indirectly e.g. by testing or monitoring the UE performance.
    Optimized CIR Report for
    The CIR reports (e.g. by delay-doppler representations) can be optimized by classifying the UE into location, scenario & mobility clusters aligned to reduce the value range in the CIR. This can be used to increase the resolution with fixed quantization range (offset, bin range, bin width) or reduce the report size without loss of significant information.
        The classification can be done at the transmitter based on previous or side information. The transmitter has to inform the receiver.
        The classification can be done at the receiver side: A larger complete range can be recorded and compressed using a suitable class (e.g. selection of a suitable quadrant). The receiver has to signal the used class.
        Dynamic adjustment of the ranges. This can be either decided by transmitter or signaled adaptively by the receiver.
    Information Needed at Rx
    For successful symbol detection at the receiver the following additional information are needed with respect to conventional, e.g. LTE/5G systems:

1. Number of delay-multiplexed symbols/layers
   A new signaling is implemented for this information
   This can be an N-bit value. Some examples are listed below:
   Maximum number delay-precoded symbols is two. With this 1-bit is sufficient to indicate whether conventional 1 symbol or 2 symbols by the proposed scheme are transmitted
   Maximum number of delay-precoded symbols is 4 or $2^N$, then 2 or N bits are needed, respectively
   Following options are possible:
   The receiver decides, e.g. based on high receive SNR or based on suitable CIR conditions, that for increasing the throughput the proposed scheme can be used, and signals to the transmitter that 2 or more symbols should be delay-precoded with the proposed scheme, e.g. BS is the receiver and UE is the transmitter. Short version: Network controlled.
   BS configures a CIR measurement report that is triggered when the CIR fulfills certain criteria at the receiver such as e.g. suitability for TDMux, distinct scatteres, short impulse response, high Doppler-spread etc.
   The transmitter, e.g., UE, can decide on his own based on a certain metric, e.g. channel quality measurements, that 2 or more symbols are delay-precoded with the proposed scheme, e.g. BS is the transmitter and UE the receiver or vice versa. This can be network or UE controlled. In case of a UE being a transmitter, the network normally decides.
   Simultaneously, this signaling can be used to indicate whether the proposed scheme is applied or not. Indicating this in an extra field, e.g. to reduce complexity, is a straight forward extension.
2. Time localization of peaks/taps/tap clusters—Using the example of 2 delay-precoded symbols, the delay/separation between the first peak corresponding to symbol 1 and the second peak corresponding to symbol 2, is denoted by $\tau_{1,2}$. This signaling it optional in the following sense. Without this signaling, the receiver detects the two highest peaks and separates them by appropriate signal processing means for channel equalization and decoding. With the additional signaling described below, an additional side-constraint is imposed, e.g. the second peak has to be within a certain threshold around the first peak plus $\tau_{1,2}$. Thus, this feedback increases the probability of successful decoding at the receiver
   A new signaling is implemented for this information
   $\tau_{1,2}$ can be signaled directly as a value, e.g. in micro- or nano-seconds or indirectly e.g. in multiple of the symbol duration, or by an index from a predefined time grid.

According to an embodiment, a device, e.g., the receiver 304, may be configured for obtaining a capability information indicating a number of precoded symbols of data signals transmitted by a transmitter. For example, the capability information may indicate a maximum number of precoded, e.g., time-delayed and/or frequency shifted, symbols of different data signals that are currently or possibly transmitted with the described precoding by a transmitter. The device 304 may comprise a wireless interface, for example, antennas and/or panels, combinations thereof or the like, configured for receiving wireless signals. The device 304 may comprise a decoder unit configured for sampling a combined data signal, e.g., the signal 332 having passed the channel so as to obtain a sampled representation of the combined data signal. The decoder unit may be configured for identifying a number of offset symbols of the sampled representation, for example, by detecting peaks as described in connection with FIG. 8. The number of offset signals may be based on the capability information. That is, the receiver may comprise information indicating a number of peaks it has to search and/or an information, where those peaks are expected in time and/or frequency. The decoder unit may be configured for separating the number of offset data signals to obtain at least a first data stream and a second data stream based on the combined data signal 332. That is, the decoded may decode the signal based on the capability information.

The device 304 may be configured for determining a quality information indicating that a channel quality to a transmitter, e.g., device 302, is above a quality threshold value. The device 304 may be configured for transmitting a request to the transmitter of the wireless signal the request or command requesting to transmit a symbol of a further signal transmitted by the transmitter as a number of time-delayed versions of the symbol.

Further embodiments relate to a wireless communication network, e.g., network 300, wherein one or more of the device 302 may be arranged. Additionally, one or more of the devices 304 may be arranged. Optionally, the receiver 304 may be implemented so as to operate based on the capability information.

Embodiments described herein relate to a number of time-delayed precoded signals transmitted by a transmitter by use of a same transmit radiation characteristic. As was described, this may allow to increase through put over the channel.

Further embodiments described herein allow to have low requirements for a receiver, e.g., device 304. Alternatively or in addition to time-delaying precoded signals at a transmitter, a network may be operated such that a transmission of signals of different apparatuses or different antenna panels is scheduled so as to arrive in an un-synchronized manner in a comparable way as described in connection with FIG. 8. That is, instead of generating the precoded signals at a same device, different devices may provide for such signals. For such a proposal, the wireless communication network may comprise a coordinator configured for coordinating a first and a second apparatus such that the first apparatus and the second apparatus transmitted their signals so as to arrive time-delayed with respect to each other at the receiver. The receiver may be configured for receiving the different signals with a same antenna reception characteristic, i.e., with a same reception beam or antenna configuration. This may be understood as receiving the signals with a same unit of spatial resolution.

Coordinating an apparatus may be performed individually but may also be performed group wise such that a group is controlled to implement a group wise time-delay of their signals. By such a control, an apparatus may deviate, responsive to the instructions received from a coordinator directly or indirectly, from a timing advance with the transmission of the signal such that an arrival of the signal comprises an offset with respect to a synchronized schedule. Accordingly, the device may deviate from frequency corrections by applying a deviation the Doppler domain.

Alternatively or in addition, the coordinator may be configured for coordinating a first and a second apparatus with regard to the time-delay and with respect to a time anchor. Such a mechanism may include a so-called delay spread parameter which may describe the spread of the channel impulse response at the targeted receiver and/or a delay instance, e.g., between the center of the main delay tap or around the main power concentration in the time domain and/or a delay tap advance, e.g., once a certain delay spread is achieved by precoding of the individual user/device, then the delay tap advance would allow to shift one receiver delay against the other by commanding the device to do so. For example, the device may be instructed to apply a specific time-delay but may deviate from this instruction by one or more parameters within certain intervals, e.g., slightly increasing or decreasing the time-delay. The coordinator unit which may be arranged as a part of the base station but may also be a different and in particular separate entity, may be configured for providing the first apparatus and/or the second apparatus with information related to a target value indicating a parameter of the delay to be applied. The first apparatus and/or the second apparatus may be adapted to operate according to the target value.

Such an operation in connection with deviating from a synchronized behavior in communication may be implemented alternatively or additionally to the described precoding of multiple signals at a same device.

In other words, an uplink, two or more users may perform precoding of the transmit signals such that the signals received at the base station are distinguishable by delays, allowing a very simple receiver structure to distinguish between the users. In case the spatial resolution at the receiver is not enough, e.g., the receiver is using a beam with which does not allow spatial separation of two or more users, communication may be enhance. Embodiments relate to a precoding, e.g., in a delay domain being performed across individual or a group of users. Embodiments also relate to mechanisms that allow the user set and the base station jointly to determine a delay control with respect to a time anchor, e.g., a specific absolute or relative time, and/or a Doppler control with respect to a shift in the Doppler domain with respect to a frequency anchor, e.g., a specific frequency. In connection with the description above, a target value/KPI (key performance indicator) like an effective signal spread may be used as feedback parameter in a standard, e.g., that 80% (or other suitable values) of the overall received signal power from a device (UE) or a MIMO layer transmitted from one UE or from several UEs should be within a certain lay spread. Alternatively or in addition, other parameters may be used.

At high system SINR at receiver k, denoted as $\gamma_k$ above a threshold $\gamma^{(tr)}$ such that $\gamma_k > \gamma^{(tr)}$ e.g. $\gamma(tr=10$ dB, at a given transmission bandwidth it becomes beneficial in terms of spectral efficiency to switch to spatial multiplexing instead of an increase in modulation and coding scheme.

In order to separate simultaneously transmitted data streams over the air the effective channel has to have a rank (spatial degrees of freedom) >1, usually this is achieved with multiple Tx and multiple Rx antennas, and this works even in narrowband channels, exploiting a rich multipath and superposition of signals at the receive antennas with random phase and amplitude if antennas are separated sufficiently.

Due to the wide bandwidth and resulting high temporal resolution of the transmitted wideband signal it becomes possible to resolve paths and/or group of paths in time or delay domain.

We propose to a concept of transmit filter design that it matches the delay structure of groups of relevant paths connecting the location of the Tx and the location of the Rx in a way making the different data streams mapped on these groups of multi-path-components (MPC) separable at the receiver side.

By this means spatial multiplexing can be exploited by using just one Transmitter antenna. The aim is to increase the transmission throughput on the physical layer, meaning that the sum rate of the spatial multiplexed transmission should be larger than the rate of the single-stream transmission. The decision can be based on the measured single stream SNR or SINR, or reference signals, for example CSI-RS, SRS, or other measurement reports such as RSRP or the like. It can also be based on the predicted SINRs or sum rate of the multiplexed transmission or the spatial structure of the channel, e.g. by the structure of the delay components.
→relevant for e.g. UE UL in FR2

1. Embodiments allow for the following benefits: A transmitter with a single transmit antenna is able to create a MIMO like spatial signature without the use of multiple transmit antennas as needed by SOTA MIMO transmission schemes.
2. The proposed scheme can be applied for radio transmission systems with a wide system bandwidth e.g. Nx 100 MHz or several GHz as well as for systems with a narrower system bandwidth but operated w.r.t. signal generation such that a transmitter sampling rate used is much higher but at least the Nyquist sampling rate in order to allow a separation of path inputs in the time domain. As an example one could create a 20 MHz wide transmit signal using a sampling rate of 100 or 400 MHz, which is equivalent to a 5 or 20 fold oversampling rate allowing a far better channel matching in delay precoding than with a minimum temporal resolution needed to sample a 20 MHz signal at Nyquist rate. That is, the device may be configured for generating transmitted signals with a lower effective signal bandwidth than an achievable signal bandwidth at a given sampling rate supported by a Digital-to-Analog converter of the precoding unit. At the transmitter a higher sampling rate than actually needed to meet the Nyquist criterium for a certain bandwidth may be used to better match the precoding filter to the channel impulse response in time domain. At the receiver, a higher sampling rate than Nyquist may be used in order to better resolve MPC which form part of the effective channel impulse response after precoding and transfer via the wireless channel.
3. The proposed solution will allow spatial multiplexing without the need of multiple transmit antennas or multiple beams to be formed by one or multiple antenna arrays at the same time.
4. The single beam/single antenna transmitter can increase throughput just by exploiting the proposed method for multiplexing without additional hardware like transceiver chains.
5. The proposed method can be used on existing UEs by implementing a Delay/Doppler precoder at the suitable transmitter sampling rate.

Although embodiments described herein relate to a wireless device such as device 302 that communicates with a receiver such as device 304, the embodiments are not limited to such a point to point communication as indicated in connection with coordinating an apparatus group wise such that a group is controlled to implement a group wise time-delay/doppler offset of their signals. Alternatively or in addition and as will be described in the following, the transceiver or device may precode the signals so as to address two or more receivers in an uplink scenario. Optionally, those two receivers may perform a joint processing of the received signals. Alternatively or in addition, the receiver may receive precoded signals from different transmitters. For example, the different transmitters may be coordinated so as to address two or more receivers.

Figure 12A:
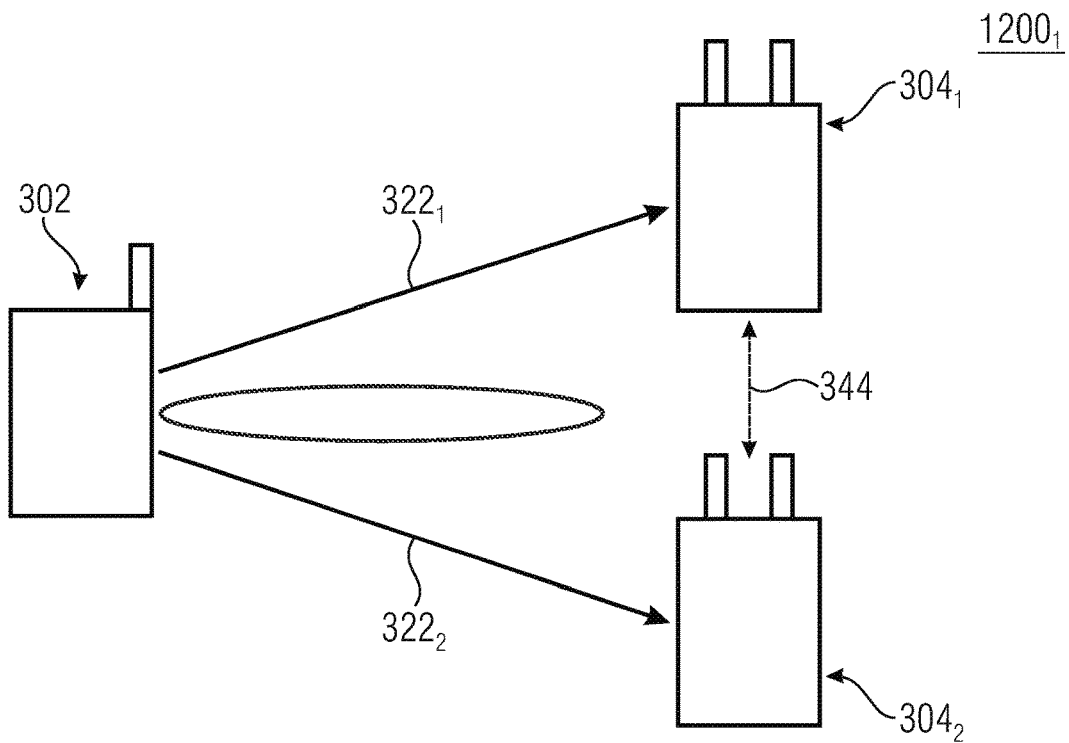
FIG. 12a shows a schematic block diagram of at least a part of a communication network in which the device precodes the signals according to channel conditions or sets of paths to different receivers.

FIG. 12a shows a schematic block diagram of at least a part of a communication network $1200_1$ in which the device 302 precodes the signals $322_1$ and $322_2$ according to channel conditions or sets of paths to different receivers $304_1$ and $304_2$. According to an embodiment, the device 302 may precode more than two signals. For example, a third precoded signal may be precoded according to the channel condition to receiver $304_1$ or $304_2$ or according to the channel condition between the device 302 and another receiver which is not shown. As explained, the device 302 may implement different, possibly disjunct, sets of multipath components to obtain precoded signals $322_1$ and $322_2$ which are then jointly transmitted.

Optionally, the receivers $304_1$ and $304_2$ may exchange copies of the signals they received by exchanging a signal 344. The signal 344 may comprise or enable one or more of the following:
  a. an exchange of decoding results
  b. an exchange of intermediate signal processing results e.g. I/Q values, soft bits, preprocessed received signals etc.
  c. a forwarding of all received signals e.g. like a distributed antenna system (DAS) towards a central base band processing unit
  d. a local processing of the stream/data intended to be received/processed by each receiver and the exchange may be at least a part of a side information to help the other base station to decode its intended message—like a helper feedback. This may be, for example, a guess about the message intended for the other BS or sharing the correctly decoded message in order to allow the other BS to better subtract the interference from the message intended for another BS/receiver by successive interference cancelation (SIC)

Embodiments may operate without exchange as well but may be enhanced by the exchange so as to allow for a joint detection That is, receiver $304_1$ may transmit a copy of the signal it received to receiver $304_2$ and/or receiver $304_2$ may transmit a copy of the signal it received to receiver $304_1$. This may allow to enhance decoding of the signal.

In other words, embodiments relate to a multiplexing from one UE to several BS in Uplink, UL, Dual Connectivity (DC) or multi-connectivity (MC). The precoding may be done according to the channel impulse responses between the UE 302 and BS1 ($304_1$) and the UE 302 and BS2 ($304_2$). In particular, the specific precoding, e.g., delay precoding has to be matched to the channel associated with the targeted BS while it should be shifted with respect to the other base station such that at the BS receivers the received signals are well separated in e.g. delay domain. Since the received signal at the other BS is not focused in, e.g., the delay domain, due to the different delay spread and tap (MPC) number and tap positions between the UE and the other BS the precoded data for the other BS will be spread out in delay domain and the choice of the delay difference/shift may be determined such that the received power concentration in, e.g. the delay domain, of the other stream is shifted considerably or if possible to a maximum distance. The terms "maximum" and "considerable" may at least be influenced by the channel impulse response structure which may be very different or very similar between the UE and BS1 and UE and BS2.

Further, embodiments relate to joint processing at two or more BS in uplink, UL when the precoding of the two (or more) streams $322_1$ and $322_2$ is done such that the streams can be separated by MIMO processing in delay domain receive via independent paths at the multiple BS.

Figure 12B:
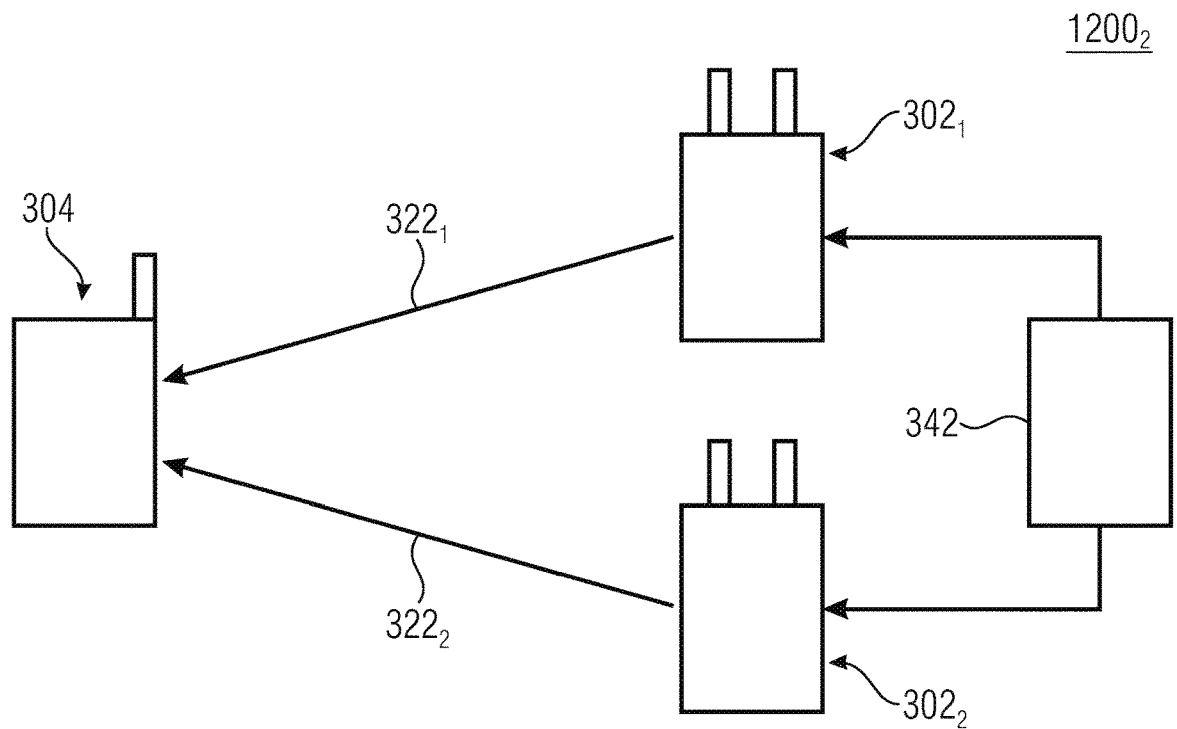
FIG. 12b shows a schematic block diagram of at least a part of a communication network in which two or more devices act as transmitters of signals, whilst a receiver receives both signals.

FIG. 12b shows a schematic block diagram of at least a part of a communication network $1200_2$ in which two or more devices $302_1$ and $302_2$ act as transmitters of signals, whilst receiver 304 receives both signals. Thus a downlink-like scenario is implemented. The transmitters $302_1$ and $302_2$ may operate as a virtual single transmitter based on a synchronization or coordination, e.g., provided by a coordinating node 342. The coordinating node may allow for providing both devices $302_1$ and $302_2$ to obtain the needed information and for operating coordinated, synchronously or synchronized. This may relate to or mean a joint processing in which a timing may tightly synchronized, coarsely synchronized, loosely synchronized or not synchronized (in time and/or frequency) at all but still coordinated. However, synchronization may address time/delay and/or frequency/Doppler domain separately or jointly.

In other words, in the same way than in the uplink scenario of FIG. 12a, two or more BS could precode their signals to the same UE such that the superposition of the streams can be separated exploiting the delay domain and different taped delay line filters.

Figure 12C:
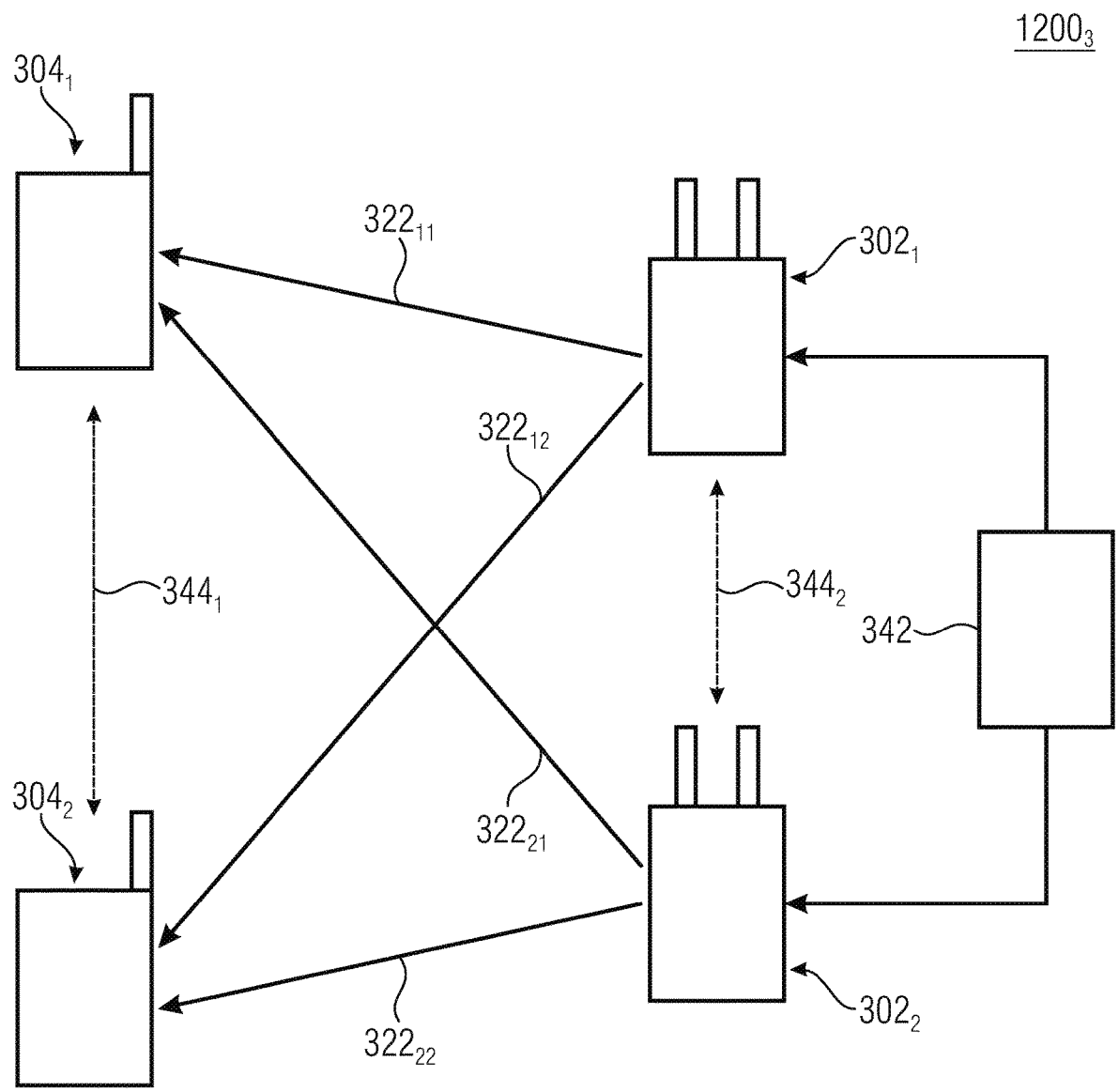
FIG. 12c shows a schematic block diagram of at least a part of a communication network in which the embodiments of FIG. 12a and FIG. 12b are combined.

FIG. 12c shows a schematic block diagram of at least a part of a communication network $1200_3$ in which the embodiments of FIG. 12a and FIG. 12b are combined by implementing synchronized (tightly synchronized, coarsely synchronized, loosely synchronized or not synchronized at all) transmitters $302_1$ and $302_2$ and more than one receiver $304_1$ and $304_2$, wherein the receivers $304_1$ and $304_2$ may receive signals from each of the devices $302_1$ and $302_2$ each. Those signals $322_{11}$ and $322_{12}$ of device $302_1$ on the one hand and $322_{21}$ and $322_{22}$ on the other may be precoded so as to comprise the offset in the delay/Doppler-domain. Devices $304_1$ and $304_2$ and/or devices $302_1$ and $302_2$ may exchange signals $344_1$ and/or $344_2$ about their respective signals received as described in connection with FIG. 12a. The concept of the network $1200_3$ may alternatively or in addition be implemented in a communication direction from devices $304_1$ and/or $304_2$ to devices $302_1$ and/or $302_2$. A selection of the set of paths may be chosen such that a low or even minimum amount of interference between the differently precoded signals is expected.

Although in the described embodiments such as the embodiments of FIG. 12a-c some devices are illustrate as having one antenna and other devices are illustrates as having two antennas, embodiments are not limited to the illustrated number of antennas. Each device may comprise an individual or groupwise (for a group of devices) number of antennas, antenna elements, antenna arrangements, antenna panels or the like. That is all transmitters and all receivers may operate with one or more transmit or/and receive antennas.

In other words, in case of the multiple UEs, the two BS precode the signals for each UE separately (one BS is transmitting to one UE, i.e., multiple instances of FIG. 3a) or jointly (two BS are preparing the signals to be transmitted to two UE. If this is perfectly or sufficiently done than this is almost equivalent to CoMP Joint transmission in DL). In the context of the described embodiments the jointly or separately precoded signals e.g. in delay domain should only be matched to parts of the MPC provided by the channel impulse response between the transmit antenna(s) and the intended receive antennas in a combination with a delay shift between the two streams such that the main received power at the UE receiver is shifted against each other and spread out to allow efficient signal separation.

A selection of multipath components to be used for precoding may be based on a consideration of interference. For example, the different sets of paths may be selected such that the signals $322_1$ and $322_2$ cause a low or minimized amount of interference to each other.

It is noted, that although indicating the receiver or device 304 as a base station, the device 304 may be any other device capable of performing multipath communication, e.g., a user device, a base station, a relay. It is noted, that although indicating the device 302 as a UE, the device 302 may be any other device capable of performing multipath communication, e.g., a user device, a base station, a relay. The device 302 and/or 304 may be stationary but may also be mobile entities of a terrestrial or non-terrestrial network.

Embodiments of the present invention have been described in detail above, and the respective embodiments and aspects may be implemented individually or two or more of the embodiments or aspects may be implemented in combination.

With regard to the above-described embodiments of the various aspects of the present invention, it is noted that they have been described in an environment in which a communication is between a transmitter, like a gNB or a UE, and a receiver, like a UE and a gNB. However, the invention is not limited to such a communication, rather, the above-described principles may equally be applied for a device-to-device communication, like a D2D, V2V, V2X communication. In such scenarios, the communication is over a sidelink between the respective devices. The transmitter is a first UE and the receiver is a second UE communicating using the sidelink resources.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the user device, UE, may be one or more of a mobile terminal, or a stationary terminal, or a cellular IoT-UE, or a vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, and/or the base station, BS, may be implemented as mobile or immobile base station and may be one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or a WiFi AP STA, e.g., 802.11ax, 802.11ad/ay or 802.11be, or any transmission/reception point, TRP, enabling an item or a device to communicate using the wireless communication network, the item or device being provided with network connectivity to communicate using the wireless communication network.

In the following, additional embodiments and aspects of the invention will be described which can be used individually or in combination with any of the features and functionalities and details described herein.

According to a first aspect, a device 302 comprises: a wireless interface 308 configured for wirelessly transmitting a signal to a receiver; a precoder unit 312 configured: for obtaining a first data signal to be transmitted and a second data signal to be transmitted; and for performing a first multipath-precoding of the first data signal according to a first set of paths between the device and the receiver to obtain a first precoded signal $322_1$; and for performing a second multipath-precoding of the second data signal according to a second set of paths between the device and the receiver to obtain a second precoded signal $322_2$; wherein the precoder unit is configured for generating the first precoded signal $322_1$ and the second precoded signal $322_2$ such that the second precoded signal $322_2$ comprises an offset in the delay/Doppler-domain with respect to the first precoded signal $322_1$ at the receiver; wherein the device is configured for transmitting the first precoded signal $322_1$ and the second precoded signal $322_2$ with a same transmit radiation characteristic of the wireless interface 308.

According to a second aspect when referring back to the first aspect, the offset comprises at least one of a delay in the time domain and a frequency shift in the Doppler domain.

According to a third aspect when referring back to any one of the first to second aspects, the device is configured for emulating a multibeam transmission of the signal to the receiver using a single beam having the transmit radiation characteristic, the single beam used for transmitting the first precoded signal $322_1$ and the second precoded signal $322_2$, the single beam being an individual beam or a superposition of beams.

According to a fourth aspect when referring back to any one of the first to third aspects, the precoder unit is configured for obtaining a channel information relating to a multipath propagation of a signal from the device to the receiver; and for selecting the first path and the second path from the multipath propagation.

According to a fifth aspect when referring back to any one of the first to fourth aspects, the wireless interface is configured for forming at least one beam of a set of beams using a beamforming technique; wherein the device is configured for using a single beam or a subset of the set of beams for transmitting the first precoded signal $322_1$ and the second precoded signal $322_2$.

According to a sixth aspect when referring back to any one of the first to fifth aspects, the precoding unit 312 comprises a first branch $336_1$ having a first precoder $318_1$ configured for obtaining the first data signal or a signal derived thereof, the first branch $336_1$ configured for generating the first precoded signal $322_1$ based on the first precoder $318_1$; and wherein the precoding unit comprises a second branch $336_2$ having a second precoder $318_2$ and an offset filter 326 configured for providing the offset in the delay/Doppler domain, the second branch $336_2$ configured for obtaining the second data signal or a signal derived thereof, the second branch configured for generating the second precoded signal $322_2$ based on the second precoder $318_2$ and the offset filter 326.

According to a seventh aspect when referring back to any one of the first to sixth aspects, the precoding unit 312 is configured for obtaining the second precoded signal $322_2$ with the offset as a delay Δt in the delay domain with respect to the first precoded signal $322_1$ which is at most a maximum channel delay between the device and the receiver; and/or wherein the precoding unit 312 is configured for obtaining the second precoded signal $322_2$ with the offset as a frequency shift in the Doppler domain and with respect to the first precoded signal $322_1$ which is at most a maximum Doppler Spread of a wireless network in which the device operates.

According to an eighth aspect when referring back to any one of the first to fifth aspects, the precoding unit 312 is configured for obtaining the second precoded signal $322_2$ with the offset as a delay Δt in the delay domain with respect to the first precoded signal $322_1$ which is at most a duration of a symbol of the first or second precoded signal $322_1$; $322_2$.

According to a ninth aspect when referring back to any one of the first to eighth aspects, the precoding unit 312 is configured for obtaining the second precoded signal $322_2$ with the offset as a delay Δt in the delay domain with respect to the first precoded signal $322_1$ which is at most a symbol sampling rate at the receiver.

According to a tenth aspect when referring back to any one of the first to ninth aspects, the precoding unit 312 is configured for obtaining the second precoded signal $322_2$ with the offset as a delay Δt with respect to the first precoded signal $322_1$ corresponds, within a tolerance range, to one of: an algebraic fraction of a symbol duration; an algebraic fraction of a length of the guard interval; an algebraic fraction or a multiple of a relevant or effective length of the channel impulse response of a channel between the device and the receiver; and a multiple of a sampling rate of the precoder unit; and/or wherein the precoding unit 312 is configured for obtaining the second precoded signal $322_2$ with the offset as a frequency shift in the Doppler domain with respect to the first precoded signal $322_1$ corresponds, within a tolerance range, to one of: an algebraic fraction of an effective doppler shift in the relevant doppler spectrum; an algebraic fraction of a length of a relevant channel impulse response; an algebraic fraction or a multiple of a subcarrier spacing of a wireless network in which the device operates; and an algebraic fraction of a system bandwidth of a wireless network in which the device operates.

According to an eleventh aspect when referring back to any one of the first to tenth aspects, the device is configured for transmitting the first precoded signal $322_1$ and the second precoded signal $322_2$ as a superposition in the time domain.

According to a twelfth aspect when referring back to any one of the first to eleventh aspects, the precoder unit is configured for obtaining the first precoded signal $322_1$ based on a first filter matched to multipath components of the first set of paths; and for obtaining the second precoded signal $322_2$ based on a second filter matched to multipath components of the second set of paths.

According to a thirteenth aspect when referring back to the twelfth aspect, the device is configured for obtaining a channel impulse response information indicating the multipath components of the first set of paths and the multipath components of the second set of paths based on at least one of: previously transmitted pilot/reference symbols in uplink and/or in downlink direction; information indicating a representation of the radio channel; a report of the receiver; and a-priori knowledge of the channel impulse response information.

According to a fourteenth aspect when referring back to the thirteenth aspect, the device is configured for obtaining a channel impulse response information indicating the first channel impulse response and the second channel impulse response based on a report of the receiver 304, wherein the report is compressed by a lossless or lossy compression.

According to a fifteenth aspect when referring back to any one of the first to fourteenth aspects, the precoding unit is configured for applying a windowing for precoding the first data signal and the second data signal.

According to a sixteenth aspect when referring back to any one of the first to fifteenth aspects, the precoding unit is configured for precoding the data signal based on at least a third path between the device and the receiver to obtain a third precoded signal so as to comprise an offset in time with respect to the first precoded signal $322_1$ and the second precoded signal $322_2$ at the receiver.

According to a seventeenth aspect when referring back to any one of the first to sixteenth aspects, the device is configured for transmitting a wireless signal comprising a first component being based on the first precoded signal $322_1$ and comprising a second component being based on the second precoded signal $322_2$; wherein the precoding unit 312 is configured for generating the first precoded signal $322_1$ and the second precoded signal $322_2$ such that the first component and the second component comprise an offset in the delay/Doppler domain with respect to each other at the receiver.

According to an eighteenth aspect when referring back to any one of the first to seventeenth aspects, the device is configured for transmitting capability information indicating that the device is configured for transmitting the first precoded signal $322_1$ and the second precoded signal $322_2$ with a same transmit radiation characteristic of the wireless interface.

According to a nineteenth aspect when referring back to the eighteenth aspect, the device is configured for transmitting the capability information so as to comprise information relating to at least one of a location, a scenario and a mobility cluster of the device.

According to a twentieth aspect when referring back to any one of the first to nineteenth aspects, the device is configured for receiving capability information indicating that the receiver is capable of decoding a combination of the first precoded signal $322_1$ and the second precoded signal $322_2$, wherein the device is configured for selecting to either transmit the first precoded signal $322_1$ and the second precoded signal $322_2$ with a same transmit radiation characteristic of the wireless interface or not based on the capability information.

According to a twenty-first aspect when referring back to any one of the first to twentieth aspects, the device is configured for receiving a request information indicating that the device is requested to transmit the first precoded signal $322_1$ and the second precoded signal $322_2$ with a same transmit radiation characteristic of the wireless interface, wherein the device is configured for operating according to the request.

According to a twenty-second aspect when referring back to any one of the first to twenty-first aspects, the device is configured for obtaining a channel information indicating a channel between the device 302 and the receiver 304, the channel information indicating that a channel quality is above a channel quality threshold; and for transmitting the first precoded signal $322_1$ and the second precoded signal $322_2$ with a same transmit radiation characteristic of the wireless interface based on the channel information.

According to a twenty-third aspect when referring back to any one of the first to twenty-second aspects, the device is configured for transmitting a delay information indicating a time delay between at least symbols of the first precoded signal $322_1$ and the second precoded signal $322_2$.

According to a twenty-fourth aspect when referring back to any one of the first to twenty-third aspects, the device comprises a single transmit antenna/antenna array/effective antenna/antenna port for transmitting the wireless signals in multiplex mode.

According to a twenty-fifth aspect when referring back to any one of the first to twenty-fourth aspects, the device is adapted to deviate, responsive to instructions received from a coordinator, a transmission of a signal with respect to a Timing Advance and/or frequency correction such that an arrival of the signal at the receiver side comprises an offset with respect to a coordinated or synchronized schedule According to a twenty-sixth aspect when referring back to any one of the first to twenty-fifth aspects, the device is configured for generating transmitted signals with a lower effective signal bandwidth than an achievable signal bandwidth at a given sampling rate supported by a Digital-to-Analog converter of the precoding unit 312.

A twenty-seventh aspect relates to a device 304 configured for obtaining a capability information indicating a number of offset symbols of data signals transmitted by a transmitter, the device comprising: a wireless interface configured for receiving wireless signals; a decoder unit configured for sampling a combined data signal received with the wireless interface so as to obtain a sampled representation of the combined data signal; for identifying a number of offset symbols in the sampled representation; the number of offset symbols being based on the capability information; wherein the decoder unit is configured for separating the number of offset data signals to obtain at least a first data stream and a second data stream based on the combined data signal; wherein the signals are offset in a delay/Doppler domain.

According to a twenty-eighth aspect when referring back to the twenty-seventh aspect, the receiver is configured for determining a quality information indicating that a channel quality to a transmitter of a wireless signal is above a quality threshold value; and for transmitting a request to the transmitter of the wireless signal, the request/command requesting to transmit a symbol of a further signal transmitted by the transmitter as a number of time-delayed versions of the symbol.

According to a twenty-ninth aspect when referring back to any one of the twenty-seventh to twenty-eighth aspects, the device is configured for sampling the combined data signal to resolve transmitted signals with a lower signal bandwidth than an achievable signal bandwidth, i.e., with a higher sampling rate than needed to meet the Nyquist criterion.

A thirtieth aspect relates to a wireless mobile communication network 300, comprising: at least one apparatus according to aspect 1; and the receiver.

A thirty-first aspect relates to the wireless mobile communication network, according to aspect 30, wherein the receiver is a device according to one of aspects 27 to 29.

A thirty-second aspect relates to a wireless mobile communication network, comprising: at least a first apparatus configured to transmit a first signal and a second apparatus configured to transmit a second signal; a receiver configured for receiving the first signal and the second signal; and a coordinator configured for coordinating the first apparatus and the second apparatus such that the first apparatus and the second apparatus transmit their signals so as to arrive with an offset in the delay/Doppler domain with respect to each other at the receiver.

According to a thirty-third aspect when referring back to the thirty-second aspect, the receiver is configured for receiving the first signal and the second signal with a same antenna reception characteristic.

According to a thirty-fourth aspect when referring back to any one of the thirty-second to thirty-third aspects, the wireless mobile communication network comprises a plurality of apparatus adapted to transmit signals, wherein the coordinator is configured for coordinating the plurality of apparatus groupwise with regard to a groupwise offset in the delay/Doppler domain of their signals.

According to a thirty-fifth aspect when referring back to any one of the thirty-second to thirty-fourth aspects, the coordinator is configured for coordinating the first apparatus and the second apparatus with respect to a time and/or frequency anchor.

According to a thirty-sixth aspect when referring back to the thirty-fifth aspect, the coordinator is configured for providing the first apparatus and/or the second apparatus with information related to a target value indicating a parameter of the offset to be applied; wherein the first apparatus and/or the second apparatus are adapted to operate according to the target value.

According to a thirty-seventh aspect when referring back to any one of the thirty-second to thirty-sixth aspects, the first apparatus and/or the second apparatus are implemented according to one of aspects 1 to 25.

A thirty-eighth aspect relates to a device configured for operating in a wireless communication network, the device being adapted to deviate, responsive to instructions received from a coordinator, a transmission of a signal with respect to a Timing Advance and/or frequency offset such that an arrival of the signal comprises an offset with respect to a synchronized schedule.

According to a thirty-ninth aspect, a method for operating a device may have the steps of: obtaining a first data signal to be transmitted and a second data signal to be transmitted; performing a first multipath-precoding of the first data signal according to a first set of paths between the device and the receiver to obtain a first precoded signal $322_1$; performing a second multipath-precoding of the second data signal according to a second set of paths between the device and the receiver to obtain and a second precoded signal $322_2$; generating the first precoded signal $322_1$ and the second precoded signal $322_2$ such that the second precoded signal $322_2$ comprises an offset in the delay/Doppler domain with respect to the first precoded signal $322_1$ at the receiver; transmitting the first precoded signal $322_1$ and the second precoded signal $322_2$ with a same transmit radiation characteristic of a wireless interface.

According to a fortieth aspect, a method for operating a device may have the steps of: obtaining a capability information indicating a number of offset symbols of data signals transmitted by a transmitter, the symbols being offset in a delay/Doppler domain: sampling a wirelessly received combined data signal so as to obtain a sampled representation of the combined data signal; identifying a number of offset symbols in the sampled representation; the number of offset data signals being based on the capability information; separating the number of offset data signals to obtain at least a first data stream and a second data stream based on the combined symbol data signal.

According to a forty-first aspect, a method for operating a wireless mobile communication network may have the steps of: coordinating a first apparatus and a second apparatus such that the first apparatus and the second apparatus transmit their signals so as to arrive with an offset in a delay/Doppler domain with respect to each other at a receiver; transmitting the first signal with the first apparatus and transmitting the second signal with the second apparatus; receiving the first signal and the second signal with the receiver.

According to a forty-second aspect, a method for operating a device in a wireless communication network may have the steps of: instructing the device so as to deviate, a transmission of a signal with respect to a Timing Advance and/or frequency offset such that an arrival of the signal comprises an offset with respect to a synchronized schedule.

A forty-third aspect relates to a computer readable digital storage medium having stored thereon a computer program having a program code for performing, when running on a computer, a method according to one of aspects 39 to 42.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 11:
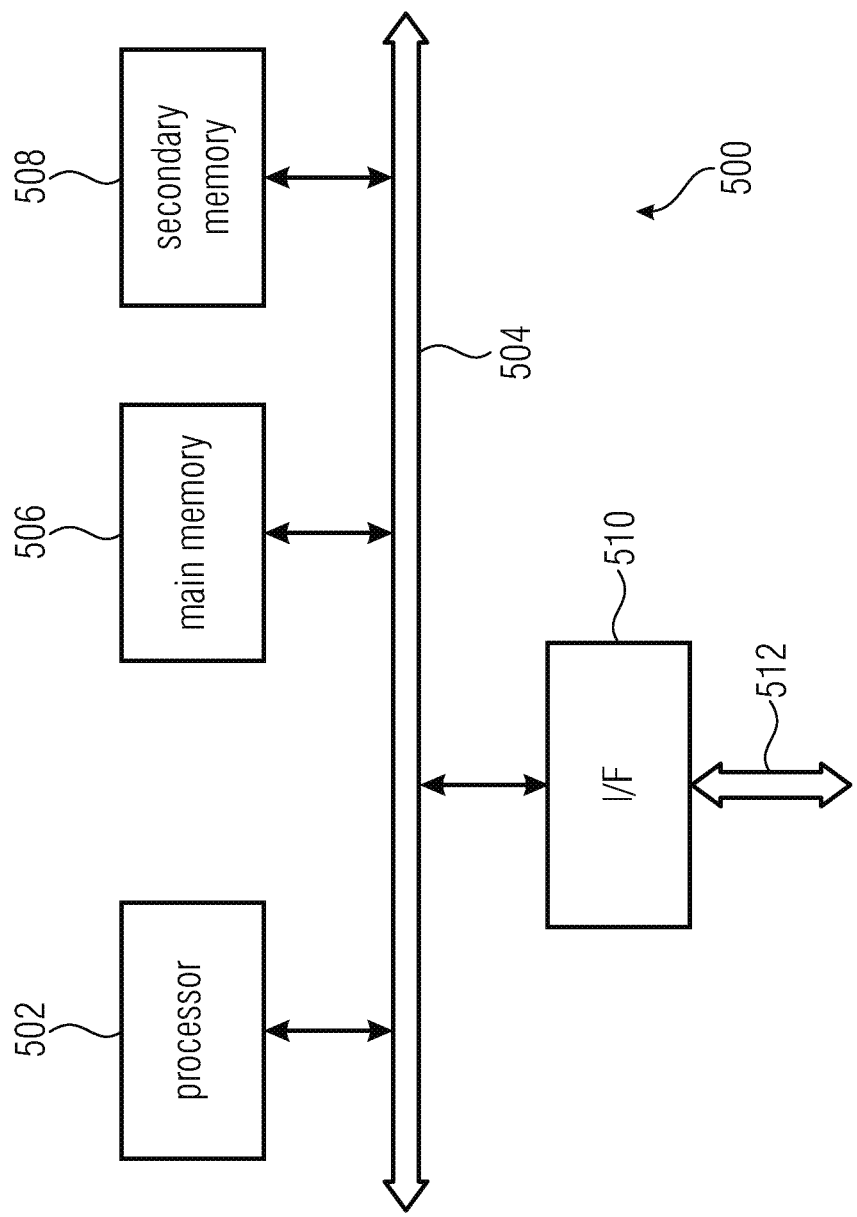
FIG. 11 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 11 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the form of electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable. Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF ACRONYMS:

| | |
|---|---|
| AOM | angular orbital momentum |
| CIR | channel impulse response |
| CSI-RS | channel state information reference signal |
| DL | Downlink |
| FR2 | frequency range 2 |
| MIMO | multiple input multiple output |
| MMSE | minimum mean square error |
| MPC | multiple path component |

-continued

LIST OF ACRONYMS:

| MU | multiple user |
| MUX | multiplexing |
| OFDM | orthogonal frequency division multiplex |
| QAM | quadrature amplitude modulation |
| QPSK | quadrature phase-shift keying |
| Rx | receiver |
| SINR | signal to noise ratio |
| SRS | sounding reference signals |
| SU | single user |
| TR | Time Reversal |
| Tx | transmitter |
| UE | user equipment |
| UL | uplink |
| w.r.t. | with respect to |

REFERENCES

| [CE10] | A. Chopra and B.L.Evans, "Design of Sparse Filters for Channel Shortening," IEEE International Conference on Acoustics, Speech and Signal Processing, Dallas, TX, USA, March, 2010 |
| [DHCG13] | Dubois, T.; Hélard, M.; Crussière, M. & Germond, C., "Performance of time reversal precoding technique for MISO-OFDM systems", EURASIP Journal on wireless communications and networking, Nature Publishing Group, 2013 |
| [EKPP10] | El-Sallabi, H.; Kyritsi, P.; Paulraj, A. & Papanicolaou, G., "Experimental Investigation on Time Reversal Precoding for Space-Time Focusing in Wireless Communications", IEEE Transactions on Instrumentation and Measurement, , 59, 1537-1543 |
| [FTY12] | Fouda, A. E.; Teixeira, F. L. & Yavuz, M. E., "Time-reversal techniques for MISO and MIMO wireless communication systems" Radio Science, vol. 47 |
| [HL17] | Han, F. & Liu, K. J. R., "Multiuser time-reversal division multiple access uplink system with parallel interference cancellation", Google Patents, 2017 |
| [HYW + 11] | Han, F.; Yang, Y.; Wang, B.; Wu, Y. & Liu, K. J. R., "Time-Reversal Division Multiple Access in Multi-Path Channels", IEEE Global Telecommunications Conference-GLOBECOM, 2011 |
| [Lo99] | Lo, T.,"Maximum Ratio Transmission", IEEE Transactions on Communications, , 47, 1458-1461 |
| [MHML15] | [MHML15] Maaz, M.; Helard, M.; Mary, P. & Liu, M., "Performance Analysis of Time-Reversal Based Precoding Schemes in MISO-OFDM Systems", IEEE 81st Vehicular Technology Conference (VTC Spring), 2015, 1-6 |
| [MYR96] | P. J. W. Melsa, R. C. Younce, and C. E. Rohrs, "Impulse response shortening for discrete multitone transceivers," IEEE Transactions on Communications, vol. 44, no. 12, pp. 1662-1672, Dec. 1996. |
| [TH15] | Tran-Ha, V. & Hong, E.-K., "An advanced Time Reversal Precoding for SIMO Systems over Correlated Channels", 2015 |
| [WWH + 11] | [WWH + 11] Wang, B.; Wu, Y.; Han, F.; Yang, Y. & Liu, K. J. R., "Green Wireless Communications: A Time-Reversal Paradigm", IEEE Journal on Selected Areas in Communications, vol. 29, p. 1698-1710 |

The invention claimed is:

1. A device comprising:
a transceiver circuit, wherein the transceiver circuit is arranged to transmit a signal to a receiver; and
a precoder circuit,
wherein the precoder circuit is arranged to acquire a first data signal and a second data signal,
wherein the precoder circuit is arranged to perform a first multipath-precoding of the first data signal according to a first plurality of paths so as to acquire a first precoded signal,
wherein the first plurality of paths are between the device and the receiver,
wherein the precoder circuit is arranged to perform a second multipath-precoding of the second data signal according to a second plurality of paths so as to acquire a second precoded signal,
wherein the second plurality of paths are between the device and the receiver,
wherein the precoder circuit is arranged to generate the first precoded signal and the second precoded signal,
wherein the second precoded signal has an offset with respect to the first precoded signal,
wherein the offset comprises at least one of a time delay and a frequency shift,
wherein the device is arranged to transmit the first precoded signal and the second precoded signal to the receiver via the transceiver circuit, and
wherein the transmission of the first precoded signal and the second precoded signal has a radiation characteristic of the transceiver circuit.

2. The device of claim 1,
wherein the device is arranged to transmit the first precoded signal and the second precoded signal in a same or an associated frequency range so as to emulate a multibeam transmission of the signal,
wherein the first precoded signal and the second precoded signal are transmitted to the receiver using a single beam,
wherein the single beam comprises the radiation characteristic of the transceiver circuit, and
wherein the single beam is an individual beam or a superposition of beams.

3. The device of claim 1,
wherein the precoder circuit is arranged to acquire a channel information,
wherein the channel information is related to a multipath propagation of the signal from the device to the receiver, and
wherein the precoder circuit is arranged to select a first path and a second path from the multipath propagation.

4. The device of claim 1,
wherein the transceiver circuit is arranged to form at least one beam of a plurality of beams using a beamforming technique, and
wherein the device is arranged to use a single beam or a portion of the plurality of beams.

5. The device of claim 1,
wherein the precoder circuit comprises a first branch,
wherein first branch comprises a first precoder,
wherein the first precoder is arranged to acquire the first data signal,
wherein the first branch is arranged to generate the first precoded signal using the first precoder,
wherein the precoder circuit comprises a second branch,
wherein the second branch comprises a second precoder and an offset filter,
wherein the offset filter is arranged to provide the offset,
wherein the second branch is arranged to acquire the second data signal, and
wherein the second branch is arranged to generate the second precoded signal using the second precoder and the offset filter.

6. The device of claim 1,
wherein the offset is a time delay, and
wherein the offset is less than or equal to a maximum channel delay between the device and the receiver.

7. The device of claim 1,
wherein the offset is a time delay,
wherein the offset is less than or equal to a duration of a symbol, and
wherein the first precoded signal or the second precoded signal comprises the symbol.

8. The device of claim 1,
wherein the offset is a time delay, and
wherein the offset is less than or equal to a symbol sampling rate at the receiver.

9. The device of claim 1,
wherein the offset is a delay, and
wherein the delay corresponds substantially to at least one of:
   an algebraic fraction of a symbol duration,
   an algebraic fraction of a length of a guard interval,
   an algebraic fraction,
   a multiple of a relevant length of a channel impulse response of a channel between the device and the receiver, and
   a multiple of a sampling rate of the precoder circuit.

10. The device of claim 1, wherein the device is arranged to transmit the first precoded signal and the second precoded signal as a superposition in time.

11. The device of claim 1,
wherein the precoder circuit is arranged to acquire the first precoded signal using a first filter,
wherein the first filter is matched to multipath components of the first plurality of paths,
wherein the precoder circuit is arranged to acquire the second precoded signal using a second filter, and
wherein the first filter is matched to multipath components of the second plurality of paths.

12. The device of claim 11,
wherein the device is arranged to acquire a channel impulse response information, and
wherein the channel impulse response information indicates the multipath components of the first plurality of paths and the multipath components of the second plurality of paths based on at least one of:
   a previously transmitted pilot/reference symbol in an uplink direction and/or in a downlink direction,
   an information indicating a representation of a radio channel,
   a report of the receiver, and
   a-priori knowledge of the channel impulse response information.

13. The device of claim 12,
wherein the channel impulse response information indicates a first channel impulse response and a second channel impulse response,
wherein each of the first channel impulse response and the second channel impulse response is based on a report of the receiver, and
wherein the report is compressed.

14. The device of claim 1,
wherein the precoder circuit is arranged to apply a windowing, and
wherein the windowing is applied to the first data signal and the second data signal.

15. The device of claim 1,
wherein the precoder circuit is arranged to precode the data signal using at least a third path between the device and the receiver so as to acquire a third precoded signal, and
wherein the third precoded signal comprises an offset in time with respect to both the first precoded signal and the second precoded signal at the receiver.

16. The device of claim 1,
wherein the first precoded signal comprises a first component based on the first precoded signal;
wherein the second precoded signal comprises a second component based on the second precoded signal, and
wherein the first component and the second component have an offset in at least one of time or frequency with respect to each other.

17. The device of claim 1,
wherein the device comprises a single transmit antenna/antenna array/effective antenna/antenna port, and
wherein the single transmit antenna/antenna array/effective antenna/antenna port is arranged to transmit in a multiplex mode.

18. The device of claim 1,
wherein the device is arranged to use a sampling rate, and
wherein the sampling rate is used for oversampling the first data signal and the second data signal so as to generate signals with a lower effective signal bandwidth than an achievable signal bandwidth at a given sampling rate.

19. The device of claim 1,
wherein the precoder circuit comprises a first branch,
wherein the first branch comprises a first precoder,
wherein the first precoder is arranged to acquire a signal derived from the first data signal,
wherein the first branch is arranged to generate the first precoded signal using the first precoder,
wherein the precoder circuit comprises a second branch,
wherein the second branch comprises a second precoder and an offset filter,
wherein the offset filter is arranged to provide the offset,
wherein the second branch is arranged to acquire a signal derived from the second data signal, and
wherein the second branch is arranged to generate the second precoded signal using the second precoder and the offset filter.

20. The device of claim 1,
wherein the offset is a frequency shift, , and
wherein the offset is less than or equal to a maximum Doppler Spread of a wireless network.

21. The device of claim 1,
wherein the offset is a frequency shift, and
wherein the frequency shift substantially corresponds to at least one of:
   an algebraic fraction of an effective doppler shift in a relevant doppler spectrum,
   an algebraic fraction of a length of a relevant channel impulse response, and
   an algebraic fraction or a multiple of a subcarrier spacing of a wireless network and an algebraic fraction of a system bandwidth of a wireless network.

22. A device comprising:
a transceiver circuit, wherein the transceiver circuit is arranged to receive at least one combined data signal; and
a decoder circuit,
wherein the decoder circuit is arranged to sample the at least one combined data signal so as to acquire a sampled representation,
wherein the sampled representation identifies a plurality of offset symbols, wherein the plurality of offset symbols is based on a capability information, wherein the decoder circuit is arranged to separate the plurality of offset symbols so as to acquire at least a first data stream and a second data stream, wherein the second data stream has an offset relative to the first data stream, and wherein the offset comprises at least one of a time delay and a frequency shift.

* * * * *